(12) United States Patent
Yamaguchi

(10) Patent No.: US 7,408,569 B1
(45) Date of Patent: Aug. 5, 2008

(54) IMAGE PROCESSING DEVICE, IMAGE PROCESSING METHOD AND RECORDING MEDIUM

(75) Inventor: Hiroshi Yamaguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1772 days.

(21) Appl. No.: 09/656,131

(22) Filed: Sep. 6, 2000

(30) Foreign Application Priority Data

Sep. 6, 1999 (JP) ................................. 11-251123

(51) Int. Cl.
*H04N 7/18* (2006.01)

(52) U.S. Cl. .................. 348/125; 348/131; 382/112

(58) Field of Classification Search .............. 348/96, 348/86–95, 125–141; 382/112–118, 141, 382/254

See application file for complete search history.

(56) References Cited

U.S. PATENT DOCUMENTS 3,758,193 A * 9/1973 Tung ........................... 359/359
4,933,983 A * 6/1990 Hiramatsu et al. .......... 382/112
5,266,805 A * 11/1993 Edgar ......................... 250/330
6,195,161 B1 * 2/2001 Edgar ....................... 356/237.1
6,529,618 B1 * 3/2003 Ohara et al. ................ 382/132

FOREIGN PATENT DOCUMENTS

JP         07-222142       8/1995
JP         11-098370       4/1999

* cited by examiner

*Primary Examiner*—Andy S Rao
(74) *Attorney, Agent, or Firm*—Sughrue Mion, PLLC

(57) ABSTRACT

The present invention provides an image processing device, an image processing method, and a recording medium that enable various defect portions to be accurately corrected. R, G, B, and IR are respectively read in an image recorded on a photographic film and transverse chromatic aberration correction is performed on each of the R, G, B, and IR image data. Subsequently, defect portions in the image being processed are detected based on the IR data, and predetermined feature amounts are calculated for the image portion being processed. Based on the results of this calculation, either one of the interpolation method or brightness adjustment method is selected as the correction method for the defect portion being processed, or the ranges in which each of these correction methods is to be applied are decided. Consequently, either one of the two correction methods or both correction methods are applied and the correction values decided, and the final correction values are then determined.

12 Claims, 11 Drawing Sheets

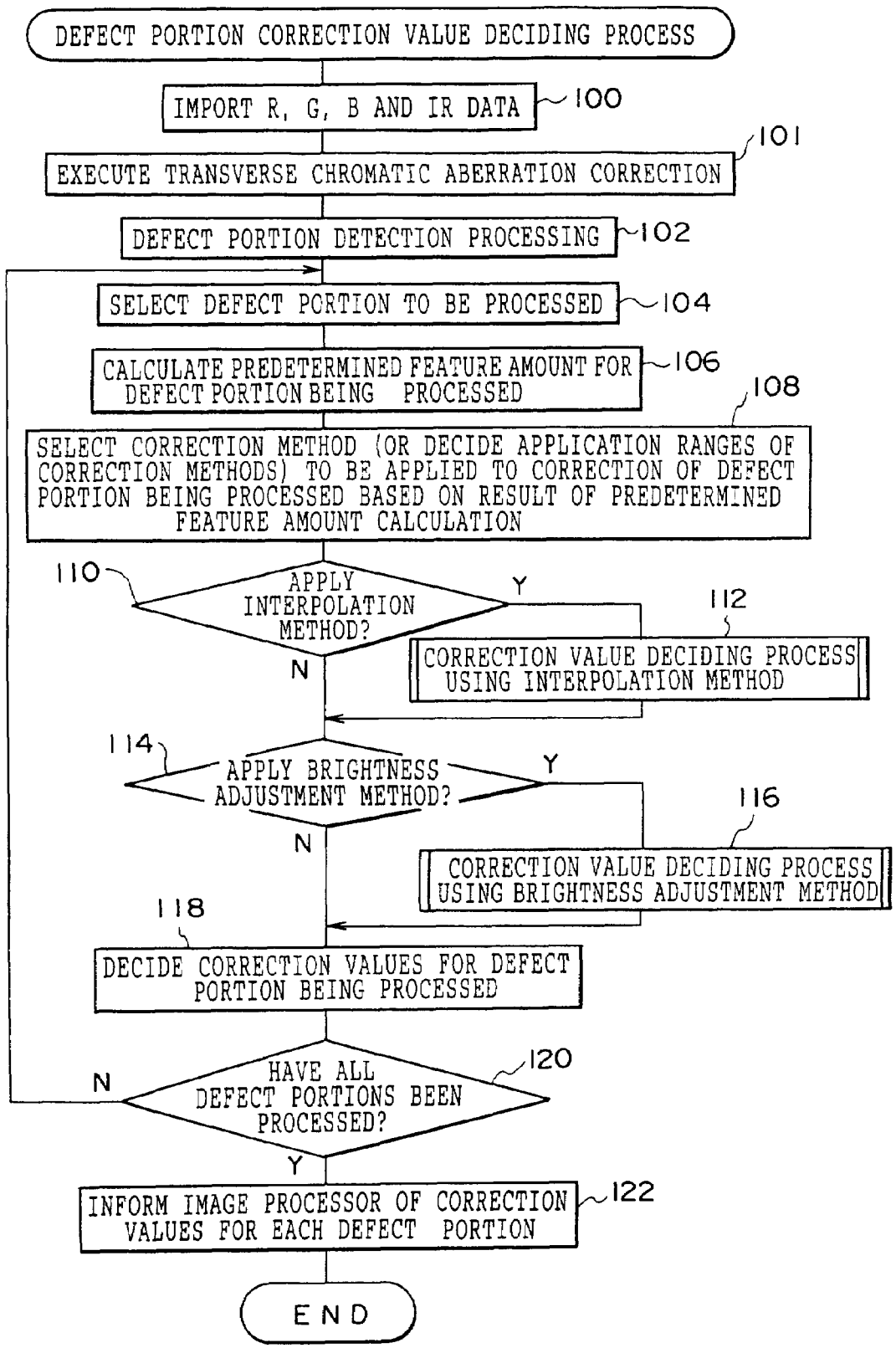

FIG. 4A

LIGHT TRANSMISSION IN PHOTOGRAPHIC FILM

| NO SCRATCHES OR FOREIGN MATTER PRESENT | SCRATCHES PRESENT | FOREIGN MATTER PRESENT |
|---|---|---|
| (TRANSMITTED LIGHT) | (TRANSMITTED LIGHT) | |

PHOTOGRAPHIC FILM

REFRACTION ↖ ↗ REFRACTION

↑ SCRATCH    ↑ FOREIGN MATTER (INCIDENT LIGHT)　(INCIDENT LIGHT)　(INCIDENT LIGHT)

| AMOUNT OF TRANSMITTED LIGHT IS ATTENUATED IN ACCORDANCE WITH LIGHT ABSORPTION OF PHOTOGRAPHIC FILM (VISIBLE LIGHT REGION ONLY) | AMOUNT OF TRANSMITTED LIGHT IS ATTENUATED IN ACCORDANCE WITH LIGHT REFRACTION DUE TO SCRATCHING IN ADDITION TO LIGHT ABSORPTION OF PHOTOGRAPHIC FILM | LIGHT TRANSMISSION IS IMPEDED BY FOREIGN MATTER AND AMOUNT OF TRANSMITTED LIGHT IS ATTENUATED TO THE EXTREME |

FIG. 4B  SCRATCHING PRESENT ON BACK SURFACE

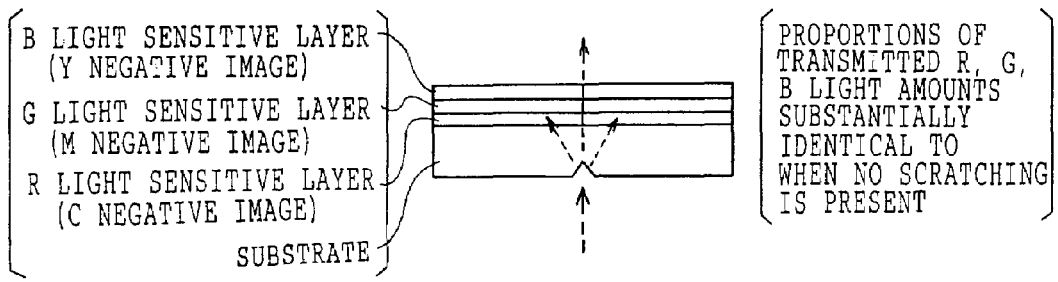

B LIGHT SENSITIVE LAYER (Y NEGATIVE IMAGE)
G LIGHT SENSITIVE LAYER (M NEGATIVE IMAGE)
R LIGHT SENSITIVE LAYER (C NEGATIVE IMAGE)
SUBSTRATE

PROPORTIONS OF TRANSMITTED R, G, B LIGHT AMOUNTS SUBSTANTIALLY IDENTICAL TO WHEN NO SCRATCHING IS PRESENT

FIG. 4C  SCRATCHING PRESENT ON EMULSION SURFACE

SHALLOW SCRATCH    DEEP SCRATCH

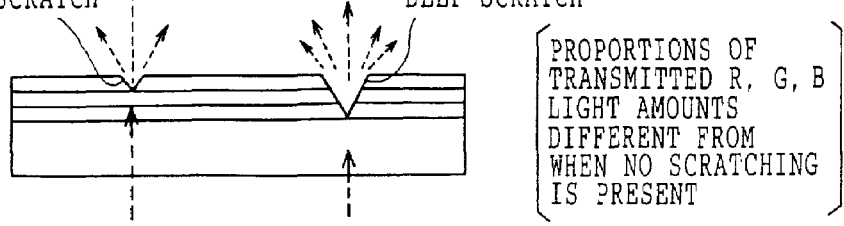

PROPORTIONS OF TRANSMITTED R, G, B LIGHT AMOUNTS DIFFERENT FROM WHEN NO SCRATCHING IS PRESENT

SCRATCHING PRESENT ON BACK SURFACE

SCRATCHING PRESENT ON EMULSION SURFACE

LOW ← CORRELATION BETWEEN R,G,B DENSITY CHANGES → HIGH
SMALL ← EDGE AND TEXTURE INTENSITY IN EDGE AREA → LARGE
LOW ← PROPORTION OVERLAPPING WITH PRINCIPAL AREA → HIGH
LOW ← CORRELATION BETWEEN R, G, B AND IR → HIGH
SMALL ← AMOUNT OF TRANSMITTED IR LIGHT → LARGE

IMAGE PROCESSING DEVICE, IMAGE PROCESSING METHOD AND RECORDING MEDIUM

BACKGROUND OF THE INVENTION

1. Field of the Invention

The present invention relates to an image processing device, an image processing method, and a recording medium. In particular, the present invention relates to an image processing device for correcting defect portions in an image represented by image information, an image processing method that can be applied to the image processing device, and a recording medium on which is recorded a program for enabling a computer to function as the image processing device.

2. Description of the Related Art

Because of the handling thereof, sometimes the emulsion surface and the back surface (i.e. the rear surface of the emulsion surface) of a photographic film become scratched. If scratches are formed within locations corresponding to the image recording area of a photographic film, and if an attempt is made to output (i.e. by recording the image on an image recording material such as photographic paper or the like, or by displaying the image on a display apparatus such as a display unit or the like) an image recorded on the scratched photographic film, then, depending on the extent of the scratching, the scratches formed on the photographic film are often clearly visible on the output image as defect portions such as low density streaks or white streaks. Moreover, if foreign matter such as dust or the like becomes attached to the surface of a photographic film, the foreign matter is clearly visible as a defect portion.

In order to try and prevent scratches on a photographic film in a surface exposure type of photographic printing apparatus that performs exposure recording of an image onto photographic paper by irradiating light onto a photographic film and irradiating the light transmitted through the photographic film onto photographic paper, a diffusion plate is positioned between the light source and the photographic film and the light scattered by the diffusion plate is irradiated onto the photographic film. However, in this technology, it is difficult to eliminate defect portions in an output image (i.e. in an image recorded by exposure on photographic paper), and the defect portions are simply reduced slightly (i.e. made less visible).

A technology applicable to an image reading device structured so as to read an image recorded on a photographic film using a reading sensor such as a CCD or the like is disclosed in Japanese Patent Application Laid-Open (JP-A) No. 11-75039. In this technology, each photographic film is read in each of at least four wavelength regions including visible light regions of three wavelengths and a non-visible light region of one wavelength (e.g. the infrared region or the ultraviolet region). Then, based on the information obtained from the reading in the non-visible light region, the image information obtained from the readings in the visible light regions is corrected.

The amount of transmitted light in the visible light regions changes in accordance with the density of the image recorded on the photographic film. In addition, the amount of transmitted light is also changed by portions of the light being refracted or reflected due to the scratching or foreign matter in those locations on the photographic film where scratching or foreign matter are present. In contrast, although the amount of transmitted light in the non-visible light regions changes in those locations where scratching or foreign matter are present on the photographic film, it is not affected by the density of the image recorded on the photographic film.

As a result, according to the technology disclosed in the above publication, scratching and foreign matter present on the photographic film are detected from the changes in the amount of transmitted light in the non-visible light regions, and it becomes possible to correct variations in the amount of transmitted light in the visible regions caused by scratching and foreign matter present on the surface of the photographic film. Namely, it becomes possible to amend defect portions of an image (i.e. of an image represented by image information obtained by the readings in the visible light regions) created by scratching or foreign matter present on the surface of the photographic film.

Various correction methods can be considered as the correction method (correction algorithm) for correcting the defect portions. Examples of these include a correction method in which a defect portion is corrected using interpolation to decide the brightness and density of the defect portion from information of the area surrounding the defect portion (an interpolation method); a correction method in which a defect portion of an image is corrected by adjusting the brightness of the defect portion area (brightness adjustment method); and a correction method in which a defect is corrected by vignetting defect portions by reducing high frequency components of the spatial frequency in the defect portion and the areas around the defect portion (vignetting method).

However, each one of these correction methods has a weak point. Namely, in the interpolation method, because interpolation is performed from changes in the density in the surrounding area adjacent to the defect portion with it being assumed that the density of the original image changes smoothly and continuously between the defect portion and the surrounding area adjacent to the defect portions, then if, for example, the change in the density is originally complex within the defect portion, the accuracy of the interpolation calculation is low (i.e. the accuracy with which the density of the original image is reproduced) and in some cases the result of the correction is somewhat inappropriate and gives a sense of incongruity to the person looking at the output result.

Moreover, when correcting defect portions using the interpolation method, the accuracy of the correction varies greatly depending on in which direction out of all the areas surrounding the defect portion (i.e. the interpolation direction) the area having the information used to perform the interpolation is present. Because the proper interpolation direction enabling the defect portion to be properly corrected is different depending on the defect portion, there is a drawback that there is a great amount of unevenness in the accuracy of the correction depending on the defect portion to be corrected.

Moreover, the color of a defect portion caused, for example, by foreign matter present on the photographic film or by scratching on the emulsion surface side of the photographic film in the image data obtained by reading an image recorded on the photographic film is often different from the color of that portion of the subject recorded by photography on the photographic film that corresponds to the defect portion. In contrast to this, because the brightness adjustment method only adjusts the brightness and does not change the color of a defect portion, it is difficult using this method to accurately correct defect portions such as those described above.

Furthermore, in the brightness adjustment method, the amount of brightness adjustment is decided based on changes in the amount of transmitted light in the non-visible light region in the region surrounding the defect portion. However, due to reasons such as the refractive indexes varying depending on the wavelength of the light because of scratching on the photographic film and the like, the changes in the amount of transmitted light in the non-visible light region in the region surrounding the defect portion usually varies slightly from the changes in the amount of transmitted light in the visible light regions caused by scratching and the like in the region surrounding the defect portion. Consequently, even if a defect portion is corrected in accordance with an amount of brightness adjustment decided on the basis of the change in the amount of transmitted light in the non-visible light region, this variation in the change of the amount of the transmitted light, for example, may remain as a minute defect portion.

In the vignetting method, because the defect portions are vignetted by reducing high frequency components of the spatial frequency in the defect portion and the area surrounding the defect portions, this method is not suitable for correcting defect portions caused by deep scratches or by the presence of comparatively large-sized foreign matter. Namely, in order to correct defect portions such as these, it is necessary to enlarge the degree of vignetting of the defect portions which tends to lower the image quality of the image. As can thus be seen, no matter which of the various correction methods described above is used, it is difficult to correct with any accuracy all of the varied types of defect portions which all have different features to each other.

Even when cells in which the relationship between the amount of incident light and the output signal is different from the initial relationship (i.e. so-called defect pixels) are present in a multiplicity of photoelectric conversion cells of the photoelectric conversion elements of a CCD or the like built into a digital still camera (referred to below as a digital camera), the same type of defect portions are created in an image represented by image data obtained by the image pickup of a subject as the defect portions caused by foreign matter or scratching on a photographic film. It is possible to correct these defect portions in the same way as the defect portions caused by foreign matter and scratching on a photographic film, however, no matter which of the above correction methods is used for such corrections, it is still difficult to accurately correct each one of the various types of defect portions.

The present invention was conceived in view of the above. It is a first object of the present invention to provide an image processing device, an image processing method, and a recording medium capable of accurately correcting all of various types of defect portions.

It is a second object of the present invention to provide an image processing device, an image processing method, and a recording medium capable of suppressing inconsistency in the correction accuracy when defects are corrected by the interpolation method.

It is a third object of the present invention to provide an image processing device, an image processing method, and a recording medium capable of improving the correction accuracy when correcting defect portions by the brightness adjustment method.

SUMMARY OF THE INVENTION

As stated above, the plurality of types of correction method for correcting defect portions of an image each have some sort of weak point, however, the present inventors noticed that the type of defect portion capable of being properly corrected using these correction methods differs for each correction method. The present inventors also noticed that different defect portions having different proper correction methods have features that are different from each other. By coming to the conclusion that it is possible to accurately correct each type of defect portion by either selectively applying any one of the above plurality of types of correction method or by properly determining the extent of application of each and then applying a combination of two or more of the plurality of correction methods to each of the defect portions in an image based on the amount of image features for each of the defect portions in an image, the present inventors were able to form the first aspect of the present invention.

Based on the above, in order to achieve the first object, the image processing device according to the first aspect of the present invention comprises: a detecting device for detecting defect portions in an image represented by image information; a deciding device for selecting which correction method from among a plurality of types of correction methods should be applied to correct a defect portion, or for deciding a range of application for each of two or more correction methods applicable to correct a defect portion; and a correction device for correcting defect portions in the image information by applying the correction method selected by the deciding device, or for correcting defect portions in the image information by applying the two or more correction methods in the application ranges decided by the deciding device.

Specifically, the image processing device according to the first aspect of the present invention may be structured such that the following is performed. Namely, light is irradiated onto an image recording material such as a photographic photosensitive material. The light which passes through or is reflected by the image recording material is photoelectrically converted (i.e. read) by photoelectric conversion elements provided with a multiplicity of photoelectric conversion cells, thus enabling image information of the image recorded on the image recording material to be acquired. Various types of correction (for example, darkness correction, shading correction, and the like) and various types of image processing (for example, color correction, density correction, and the like) are performed and the image information is output. Alternatively, the image processing device according to the first aspect of the present invention may be structured such that image information of an image that includes a subject is obtained by photoelectrically converting light from the subject using a photoelectric conversion element. The acquired image information is then stored on an information recording medium (this structure is known as a digital camera). In addition, an image reading device for reading an image recorded on an image recording material or a device structured so as to acquire image information from an image information input device such as the image reading device or digital camera may be used as the image processing device according to the first aspect of the present invention.

The image processing device according to the first aspect of the present invention is further provided with a detecting device for detecting defect portions in an image represented by image information. Specifically, the detection of these defect portions can be performed in the manner described below. Namely, when the image information represents an image recorded on an image recording material, the detection of defect portions caused by foreign matter and scratching present on the image recording material is performed, as in the second aspect, by, for example, irradiating non-visible light onto the image recording material on which an image is recorded and performing the detection based on the result of the photoelectrical conversion of the non-visible light that has either passed through or been reflected by the image recording material. Moreover, in an aspect in which image information is acquired using a photoelectric conversion element, if, for example, information for specifying defect pixels in the photoelectric conversion element discovered by scanning is stored in a storage device during the manufacture of the image processing device, the detection of defect portions generated by the defect pixels in the photoelectric conversion element can be performed by reading the information specifying the defect pixels stored in the storage device.

Based on the amount of the features of each defect portion, the deciding device according to the first aspect of the present invention either selects the correction method that should be applied to correct a defect portion, or decides the extent of the application of each of two or more correction methods to be applied to a defect portion. Therefore, it is possible for the most appropriate correction method to be selected or for the most appropriate application ranges to be decided so that the defect portion is properly corrected. Note that, as is described in the fifth aspect, for example, it is possible for the interpolation method in which information of a defect portion is determined by interpolation from information of the areas surrounding the defect portion, and the brightness adjustment method in which image information corrected so that the brightness of the defect portion is changed to be included among the plurality of types of correction method. In addition, the vignetting method in which image information is corrected by reducing high frequency components of the spatial frequency in the defect portion and the area adjacent to the defect portion so that the defect portion is vignetted may also be included among the plurality of types of correction method.

The correction device according to the first aspect of the present invention either corrects defect portions in the image information by applying the correction method selected by the deciding device, or corrects defect portions in the image information by applying the two or more correction methods in the application ranges decided by the deciding device. Therefore, it is possible to accurately correct each of various defect portions (for example, defect portions which can be properly corrected by different correction methods).

Note that, as in the second aspect of the present invention, when an image recorded on an image recording material is represented by image information, it is preferable if the detection device detects defect portions in an image from the result obtained when non-visible light is irradiated onto an image recording material on which an image is recorded, and the non-visible light that passes through the image recording material or is reflected by the image recording material is photoelectrically converted. If this method is used, the detection of defect portions generated by foreign matter or scratching present within the image recording area of the image recording material is guaranteed.

In the third aspect of the present invention, the deciding device according to the first aspect of the present invention selects the correction method which should be applied or decides the application ranges using as amounts of features of the defect portion at least one of: a correlation of density changes in each component color in areas adjacent to the defect portion in an image represented by image information; density distribution in areas surrounding the defect portion of the image; whether or not the defect portion is present within a principal area of the image; and to what extent the defect portion overlaps with the principal area.

For example, a defect portion in which information of the original color is remaining can be accurately corrected using the brightness adjustment method or another similar correction method, however, to correct a defect portion in which there is no original color remaining, it is more appropriate to apply the interpolation method or another similar correction method. If information of the original color is remaining in the defect portion, the correlation between the density changes of each component color in the area adjacent to the defect portion is often strong, while the same correlation is often weak if information of the original color does not remain in the area adjacent to the defect portion. Therefore, it is possible to divide up defect portions having different suitable correction methods based on the correlation between the density changes of each component color in areas adjacent to the defect portion.

Moreover, defect portions having gradual density changes in the surrounding area, for example, can be accurately corrected using the interpolation method or some other suitable correction method, however, locations where the density in the area surrounding a defect portion changes abruptly (i.e. edges) and defect portions where texture (i.e. a state where a fine pattern is uniformly distributed) is present are more appropriately corrected using the brightness adjustment method or another similar correction method (this also depends on whether or not the original color is remaining in the defect portion). Defect portions having different suitable correction methods such as those above can be divided up on the basis of the density distribution in the areas surrounding each defect portion.

Furthermore, because the principal areas in the image (for example, an area corresponding to the face of a person or the like) are the areas which are given close attention when an image is looked at, if a defect portion is located in a principal area, or if a portion of the defect portion overlaps with a principal area and the overlapping proportion is high, then it is not preferable if the result of the correction of the defect portion is inappropriate, and, depending, of course, on whether or not the original color is still remaining, the brightness adjustment method or another similar correction method is applied. Defect portions such as these are extracted based on whether or not the defect portion is present within a principal area of the image, or on the proportion of the overlap of the defect portion with the principal area.

In the third aspect of the present invention, because the deciding device selects the correction method which should be applied or decides the application ranges using at least one of: a correlation of density changes in each component color in areas adjacent to the defect portion in an image represented by image information; density distribution in the area surrounding the defect portion of the image; whether or not the defect portion is present within a principal area of the image; and to what extent the defect portion overlaps with the principal area, it is possible to accurately select the correction method or to decide the application range.

In the fourth aspect of the present invention, the deciding device according to the second aspect of the present invention selects the correction method which should be applied or decides the application ranges using as a feature amount of the defect portion at least one of a correlation between a change in an amount of transmitted or reflected non-visible light in an area adjacent to the defect portion when non-visible light is irradiated onto the image recording material and a change in an amount of transmitted or reflected visible light in an area adjacent to the defect portion when visible light is irradiated onto the image recording material, and at least one of an amount of transmitted or reflected non-visible light in an area adjacent to the defect portion.

It is possible to determine whether or not original color information is remaining in a defect portion from the correlation between the density changes in each component color in the area adjacent to the defect portion in the manner described above, however, if the image information represents an image recorded on an image recording material, then if original color information is remaining in the defect portion, there is a strong correlation between the change in the amount of transmitted or reflected non-visible light in the area adjacent to the defect portion when non-visible light is irradiated onto the image recording material and the change in the amount of transmitted or reflected visible light in the area adjacent to the defect portion when visible light is irradiated onto the image recording material. If, however, original color information is not remaining in the defect portion, the above correlation is weak. As a result, based on the correlation between the changes in the amounts of transmitted or reflected non-visible and visible light in the area adjacent to the defect portions, it is possible to distinguish which defect portions have which appropriate correction methods.

Moreover, because the result of the correction stands out in a large scale defect portion if it is not the proper one, the brightness adjustment method or another similar correction method is applied when correcting defect portions such as these. When the image information represents an image recorded on an image recording material, the scale and the like of the defect portion in the image represented by the image information can be determined from the amount of transmitted or reflected non-visible light in the area adjacent to the defect portion when non-visible light is irradiated onto the image recording material.

In the fourth aspect of the present invention, because the deciding device selects the correction method which should be applied or decides the application ranges using at least one of the correlation between the changes in the amounts of transmitted or reflected non-visible light in the area adjacent to a defect portion and the amount of transmitted or reflected non-visible light in the area adjacent to the defect portion, the selection of the correction method or the deciding of the application ranges can be accurately performed.

Note that, in cases such as when the image recording material is a transmission original in which a plurality of different types of dye layers are formed on one surface of a substrate having light transmission properties (i.e. such as a photographic film), the amount of transmitted light in locations where scratching is present on the image recording material is generally reduced regardless of the wavelength of the light. However, when a dye layer of the image recording material has been damaged by the scratching, the amount of transmitted light in the wavelength range corresponding to the damaged dye layer is greater than the amount of transmitted light in locations surrounding the damaged location. In addition, when a dye layer is damaged by scratching in this way, because original color information does not remain in the defect portion caused by the scratching, the interpolation method or another similar correction method is applied when correcting this type of defect portion.

Based on the above, in the sixth aspect of the present invention, when light of a predetermined plurality of wavelength regions from among non-visible and visible light regions is irradiated onto the image recording material, then if the amount of non-visible transmitted light in the defect portion is less than the amount of non-visible transmitted light in an area surrounding the defect portion, and if the amount of transmitted light of at least one wavelength region from among the plurality of wavelength regions in the defect portion is greater than the amount of transmitted light in the area surrounding the defect portion, the deciding device selects, as the correction method to be used for correcting the defect portion, an interpolation method in which information of a defect portion is obtained by interpolation from information of an area surrounding the defect portion. As a result, an accurate determination can be made as to whether or not a defect portion whose correction method is being selected is one that corresponds to a location where a dye layer has been damaged by scratches present on the image recording material. It is also possible to accurately correct a defect portion created by scratches that have damaged the dye layer.

If there is a reduction in the amount of transmitted light in a predetermined location on the image recording material that corresponds to the defect portion regardless of the light wavelength, the likely cause is that a scratch that has not damaged the dye layer or some foreign matter is present at the predetermined location. If, however, a location exists on the image recording material where, for example, regardless of the light wavelength, the amount of transmitted light is reduced after the foreign matter has been removed, the assumption can then be made that a scratch is present at that location that has not damaged the dye layers. Because information on the original color still remains in a defect portion created by scratches such as these, the brightness adjustment method or another similar correction method is applied to the correction of this type of defect portion.

Based on the above, in the seventh aspect of the present invention, when light of a predetermined plurality of wavelength regions from among non-visible and visible light regions is irradiated onto the image recording material, then if the amount of any of non-visible transmitted light and transmitted light of the plurality of wavelength regions in the defect portion is less than the amount of any of non-visible transmitted light and transmitted light of the plurality of wavelength regions in an area surrounding the defect portion, the deciding device selects as the correction method to be used for correcting the defect portion a brightness adjustment method in which image information is corrected such that the brightness of the defect portion changes. As a result, an accurate determination can be made as to whether or not a defect portion whose correction method is being selected is one that corresponds to a location where a dye layer has not been damaged by scratches present on the image recording material. It is also possible to accurately correct defect portions caused by scratches that have not damaged a dye layer.

In order to achieve the second object, the eighth aspect of the present invention is an image processing device comprising: a feature amount calculation device for calculating respective amounts of image features in a plurality of different directions from inside a defect portion present in an image represented by image information; an individual correction value calculation device for obtaining by interpolation correction values for correcting the defect portion from information of an area present in a predetermined direction on the image relative to the defect portion for each of the plurality of directions; a final correction value calculation device for obtaining, based on amounts of image features of each direction calculated by the feature amount calculation device, a final correction value from correction values calculated for each direction by the individual correction value calculation device; and a correction device for correcting the defect portion in the image information using a final correction value calculated by the final correction value calculation device.

In the eighth aspect of the present invention, image feature amounts are calculated by a feature amount calculation device in each of a plurality of different directions running from a defect portion present in an image represented by image information. Note that the feature amount calculation device is able to use, as the image feature amounts to be calculated, image feature amounts in a direction which can be evaluated as being a suitable direction or not for interpolation. For example, image feature amounts can be used for which it can be determined whether or not a boundary of the image area is present or whether or not texture is present. Image feature amounts associated with boundary positions between defect portions and non-defect portions can also be used.

The individual correction value calculation device according to the eighth aspect of the present invention obtains by interpolation correction values for correcting a defect portion from the information in an area present in a predetermined direction on the image relative to the defect portion for each of a plurality of directions. The final correction value calculation device obtains, based on image features amounts in each direction calculated by the feature amount calculation device, a final correction value from correction values calculated for each direction by the individual correction value calculation device. The final correction values, for example, decide the weighting of each direction from the image feature amounts in each direction, and can be obtained, for example, by calculating the weighting average of the correction values for each direction.

Thus, in the eighth aspect of the present invention, because correction values are determined for each of a plurality of directions, the final correction values are determined from which direction has the highest likelihood of being the proper interpolation direction and from the correction values in each direction based on the image feature amounts for each direction. Therefore, the final correction values can be calculated such that the correction values for a direction estimated from the image feature amount to be the proper interpolation direction have a great effect on the final correction values. Accordingly, according to the eighth aspect of the present invention, it is possible to reduce the effect brought about by the proper interpolation direction for each defect portion being different, and unevenness in the correction accuracy when correcting defect portions using the interpolation method can be suppressed.

In the ninth aspect of the present invention, the feature amount calculation device according to the eighth aspect of the present invention calculates, as the image feature amount, for each of a plurality of directions at least one of: a density change in the image along a predetermined direction; a change in an amount of non-visible light along a predetermined direction transmitted through the image recording material or reflected by the image recording material when non-visible light is irradiated onto an image recording material on which an image represented by the image information is recorded; a number of defect pixels present on the image within a fixed distance along the predetermined direction; and a distance traced along the image to a point in a predetermined direction at which normal pixels that do not belong to a defect portion appear.

In the interpolation method, because interpolation is performed on the assumption that the original image density changes smoothly and continuously in the defect portion and in the surrounding areas adjacent to the defect portion, for example, if areas are present around the defect portion in which the density changes greatly or in a complex manner, such as at the boundary of different image areas or in textured areas, the accuracy of the interpolation calculation is reduced if a direction in which such areas are present is used as the interpolation direction. Accordingly, an appropriate interpolation direction (i.e. one in which a high degree of accuracy is obtained in the interpolation calculation) is a direction different to the one in which the above areas are present. It is possible to determine the existence or otherwise of a boundary between image areas or a textured area or the like from the density changes along each direction.

Moreover, in the interpolation method, the longer the length of the defect portion along the interpolation direction (the interpolation length), the more diminished the accuracy of the interpolation calculation becomes. Namely, the proper interpolation direction is one in which the interpolation length is short. The interpolation length can be determined from any of: a change in an amount of non-visible light transmitted through the image recording material or reflected by the image recording material when non-visible light is irradiated onto an image recording material on which an image represented by the image information is recorded (this makes possible the detection of a position of a boundary of a defect portion); a number of defect pixels present on the image within a fixed distance; and a distance traced along the image to a point at which normal pixels that do not belong to a defect portion appear (namely, the interpolation length can be determined from image feature amounts associated with the position of a boundary between a defect portion and a non-defect portion.)

In the ninth aspect of the present invention, because, as an image feature amount, at least one of the following is calculated for each of a plurality of directions, namely: a density change in the image along a predetermined direction; a change in an amount of non-visible light along a predetermined direction transmitted through the image recording material or reflected by the image recording material when non-visible light is irradiated onto an image recording material on which an image represented by the image information is recorded; a number of defect pixels present on the image within a fixed distance along the predetermined direction; and a distance traced along the image to a point in a predetermined direction at which normal pixels that do not belong to a defect portion appear, it is possible to obtain image feature amounts which allow an accurate evaluation to be made as to whether or not each of a plurality of directions is a proper interpolation direction.

In the tenth aspect of the present invention, at least one of the feature amount calculation device and the individual correction value calculation device according to the eighth aspect of the present invention performs, for each of the plurality of directions, a calculation to determine the image feature amount or the correction value in a range as far as to a point, when tracing along the image in a predetermined direction, at which a fixed number of normal pixels that do not belong to a defect portion appear.

In the tenth aspect of the present invention, because the calculation of the image feature amounts or correction values in each direction is performed as far as to a point, when tracing along an image in a predetermined direction, at which a fixed number (for example, a number which does not hamper the calculation of the image feature amounts or the correction values) of normal pixels that do not belong to a defect portion appear, the time required to calculate the image feature amounts or the correction values can be shortened.

In order to achieve the third object, the eleventh aspect of the present invention is an image processing device comprising: a calculation device for calculating a brightness alteration amount for correcting a defect portion of an image that is detected from image information representing the image which is recorded on an image recording material, based on an amount of transmitted or reflected non-visible light in an area adjacent to the defect portion when non-visible light is irradiated onto the image recording material, and a difference in the refractive indexes of visible light and non-visible light in the image recording material; and a correction device for correcting the image information such that the brightness of the defect portion of the image represented by the image information changes by an amount of brightness change that has been calculated by the calculation device.

The amount of transmitted or reflected non-visible light when non-visible light is irradiated onto an image recording material is not affected by the density of the image recorded on the image recording material and only changes because of scratches or the like present on the image recording material. However, because of the difference between the refractive indexes of visible light and non-visible light in the image recording material, the amount of change in the transmitted or reflected non-visible light at this time is different to the amount of change in the transmitted or reflected visible light caused by scratches and the like present on the image recording material when visible light is irradiated onto the image recording material.

In contrast to this, because the calculation device according to the eleventh aspect of the present invention calculates a brightness alteration amount for correcting a defect portion based on an amount of transmitted or reflected non-visible light in an area adjacent to the defect portion when non-visible light is irradiated onto the image recording material, and a difference in the refractive indexes of visible light and non-visible light in the image recording material, it is possible to accurately determine the amount of change in the amount of transmitted or reflected visible light caused by scratches or the like present on the surface of the image recording material, and it is also possible to calculate the brightness alteration amount so that the above amount of change is accurately corrected. In addition, because the correction device corrects the image information so that the brightness of the defect portion is changed by the calculated amount of change in the brightness, it is possible to improve the accuracy of the correction of the defect portion using the brightness adjustment method.

Note that, as described below in the twelfth aspect of the present invention, it is possible to obtain a feature amount representing the difference between the refractive indexes of visible light and non-visible light in the image recording material by calculating the ratio of a value obtained when high frequency components are extracted from the change in the amount of transmitted or reflected non-visible light in areas adjacent to a defect portion when non-visible light is irradiated onto the image recording material and a value obtained when high frequency components are extracted from the change in the amount of transmitted or reflected visible light in areas adjacent to a defect portion when visible light is irradiated onto the image recording material. By extracting the high frequency components from the changes in the amounts of non-visible and visible light, it is possible to remove the direct current components and low frequency components (these components are almost never caused by scratches or the like) from the change in the amount of light, and it is possible to obtain a feature amount that accurately represents a ratio of the amounts of light caused by the difference in the refractive indexes.

Moreover, as is described in the twelfth aspect, it is also possible to acquire feature amounts representing the difference in the refractive indexes based on the type of the image recording material. Namely, because, broadly speaking, the difference in the refractive indexes for each wavelength is determined by the quality of the image recording material (specifically, by the quality of the material of the substrate), it is possible to determine differences in the refractive indexes of visible light and non-visible light from the type of image recording material, and to acquire feature amounts representing such differences.

In the twelfth aspect of the present invention, a feature amount representing a difference between the refractive indexes of visible light and non-visible light in an image recording material is acquired either on the basis of the type of image recording material, or by calculating a ratio of a value obtained when high frequency components are extracted from a change in the amount of transmitted or reflected non-visible light in an area adjacent to the defect portion when non-visible light is irradiated onto the image recording material and a value obtained when high frequency components are extracted from a change in an amount of transmitted or reflected visible light in an area adjacent to the defect portion when visible light is irradiated onto the image recording material. Therefore, it is possible to determine brightness alteration amounts for accurately correcting changes in the amount of transmitted or reflected visible light caused by scratches and the like on the image recording material by calculating the brightness correction amounts using the above feature amount.

In the image processing method according to the thirteenth aspect of the present invention: a defect portion in an image represented by image information is detected; based on a feature amount in the defect portion, either a correction method that should be applied to correct the defect portion is selected from a plurality of correction methods, or ranges of application of each of two or more correction methods to be applied to the correction of the defect portion are decided; and either correction of the defect portion is performed by applying the selected correction method to the image information, or correction of the defect portion is performed by applying each of the two or more correction methods in the application ranges decided to the image information. Therefore, in the same way as in the first aspect of the present invention, it is possible to correct various defect portions each with a high degree of accuracy.

In the image processing method according to the fourteenth aspect of the present invention, the following are performed. Namely, image feature amounts are calculated for defect portions present in an image represented by image information along a plurality of different directions running from inside the defect portion. In addition, correction values for correcting the defect portions are obtained by interpolation from information of areas in a predetermined direction on the image relative to the defect portion for each of the plurality of directions. Final correction values are determined from the correction values for each direction based on the image feature amounts in each direction, and correction of the defect portions is performed on the image information using the final correction values. Therefore, in the same way as in the eighth aspect of the present invention, it is possible to suppress unevenness in the accuracy of the correction when correcting defect portions using the interpolation method.

In the image processing method according to the fifteenth aspect of the present invention, a brightness alteration amount for correcting a defect portion of an image that is detected from image information representing the image which is recorded on an image recording material is calculated based on the amount of transmitted or reflected non-visible light in the area adjacent to the defect portion when non-visible light is irradiated onto the image recording material, and on the difference in the refractive indexes of visible light and non-visible light in the image recording material. Moreover, the image information is corrected so that the brightness of the defect portion in the image represented by the image information changes by the brightness change amount calculated by the calculation device. Therefore, in the same way as in the eleventh aspect of the present invention, it is possible to correct the defect portion with a high degree of accuracy using the brightness adjustment method.

The recording medium according to the sixteenth aspect of the present invention has a program recorded thereon for executing on a computer a process including the following steps: a first step in which a defect portion of an image represented by image information is detected; a second step in which, based on an amount of features of the defect portion, either a correction method to be applied in a correction of the defect portion is selected from a plurality of types of correction method, or ranges of application of each of two or more correction methods to be applied in a correction of the defect portion are decided; and a third step in which either correction of the defect portion is performed by applying the selected correction method to the image information, or correction of the defect portion is performed by applying the two or more correction methods to the image information in the application ranges decided for each.

Because a program for enabling a process that includes the above first through third steps, namely, a computer, to function as the image processing device described in the first aspect is recorded on the recording medium according to the sixteenth aspect of the present invention, by reading and executing the program recorded on the recording medium, the computer is able to accurately correct each of various defect portions, in the same way as in the first aspect of the present invention.

The recording medium according to the seventeenth aspect of the present invention has a program recorded thereon for executing on a computer a process including the following steps: a first step in which image feature amounts are calculated for defect portions present in an image represented by image information along a plurality of different directions running from inside the defect portion, and correction values for correcting the defect portions are obtained by interpolation from information of an area in a predetermined direction on the image relative to the defect portion for each of the plurality of directions; a second step in which final correction values are determined from the correction values for each of the directions based on the image feature amounts in each of the directions; and a third step in which correction of the defect portions is performed on the image information using the final correction values.

Because a program for enabling a process that includes the above first through third steps, namely, a computer, to function as the image processing device described in the eighth aspect is recorded on the recording medium according to the seventeenth aspect of the present invention, by reading and executing the program recorded on the recording medium, the computer is able to suppress unevenness in the correction accuracy when correcting defect portions using the interpolation method, in the same way as in the eighth aspect of the present invention.

The recording medium according to the eighteenth aspect of the present invention has recorded thereon a program for executing on a computer a process including the following steps: a first step in which a brightness alteration amount for correcting a defect portion of an image that is detected from image information representing the image which is recorded on an image recording material is calculated based on the amount of transmitted or reflected non-visible light in an area adjacent to the defect portion when non-visible light is irradiated onto the image recording material, and on the difference in the refractive indexes of visible light and non-visible light in the image recording material; and a second step in which the image information is corrected so that the brightness of the defect portion in the image represented by the image information changes by the brightness change amount calculated by the calculation device.

Because a program for enabling a process that includes the above first through third steps, namely, a computer, to function as the image processing device described in the eleventh aspect is recorded on the recording medium according to the eighteenth aspect of the present invention, by reading and executing the program recorded on the recording medium, the computer is able to correct defect portions with a high degree of accuracy using the brightness adjustment method, in the same way as in the eleventh aspect of the present invention.

BRIEF DESCRIPTION OF THE DRAWINGS

FIG. 3 is a flow chart showing the contents of processing to decide a defect portion correction value.

FIG. 4A is a schematic view showing the transmission of light in a location where neither scratches nor foreign matter are present on a photographic film, a location where scratches are present, and a location where foreign matter is present.

FIG. 4B is a schematic view showing the transmission of light when scratches are present on the back surface of a photographic film.

FIG. 4C is a schematic view showing the transmission of light when scratches are present on the emulsion surface of a photographic film.

DESCRIPTION OF THE PREFERRED EMBODIMENTS

A description will now be given in detail of the embodiment of the present invention with reference made to the drawings. Note that the description below is of an example in which defect portions, caused by scratching or foreign matter present on the surface of a photographic film, are corrected.

Figure 1:
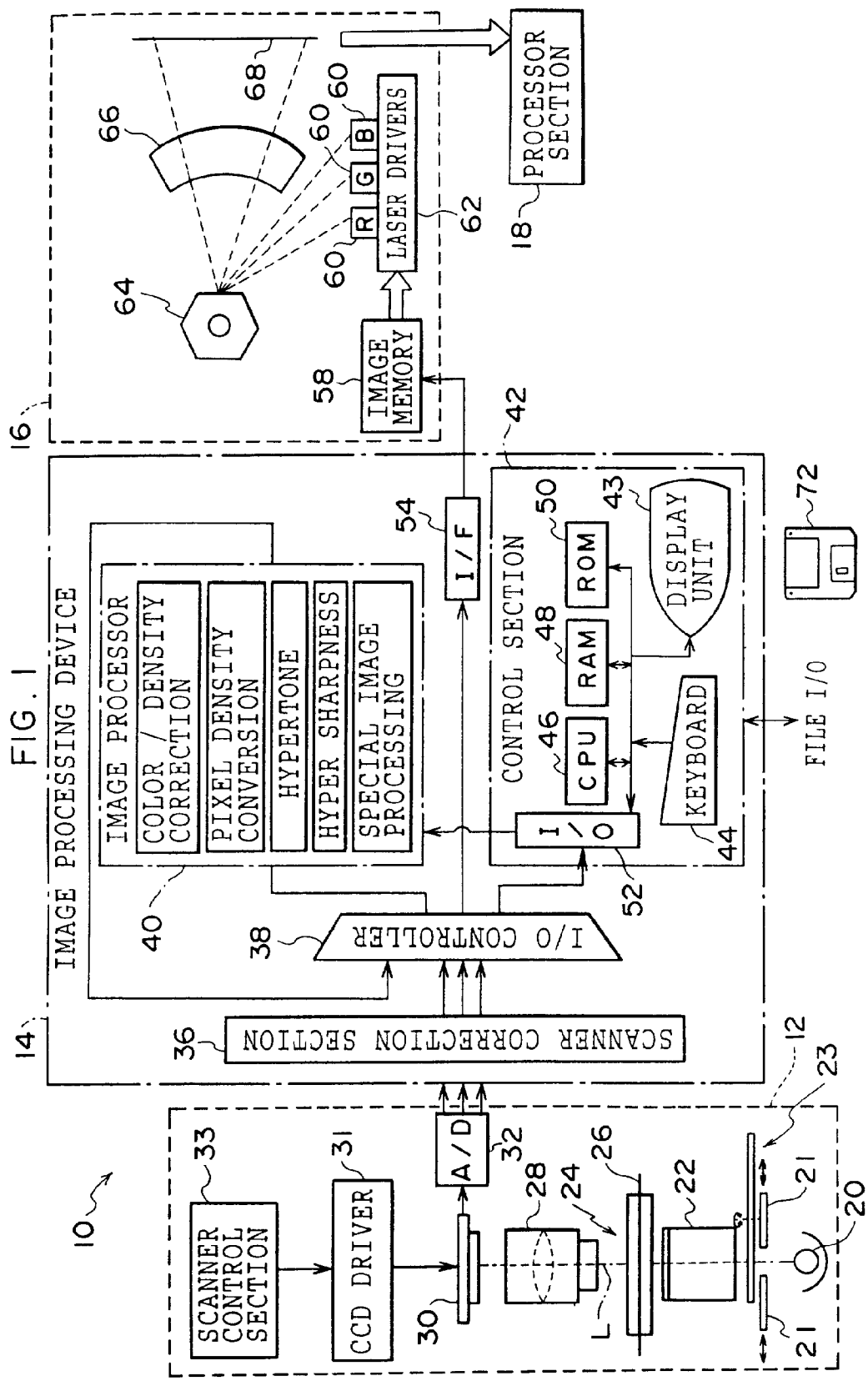
FIG. 1 is a schematic structural diagram of the image processing system according to the present embodiment.

FIG. 1 shows an image processing system 10 according to the present embodiment. The image processing system 10 is constructed from a film scanner 12, an image processing device 14, and a printer 16 connected in a series. Note that the film scanner 12 and the image processing device 14 correspond to the image processing device of the present invention.

Figure 2:
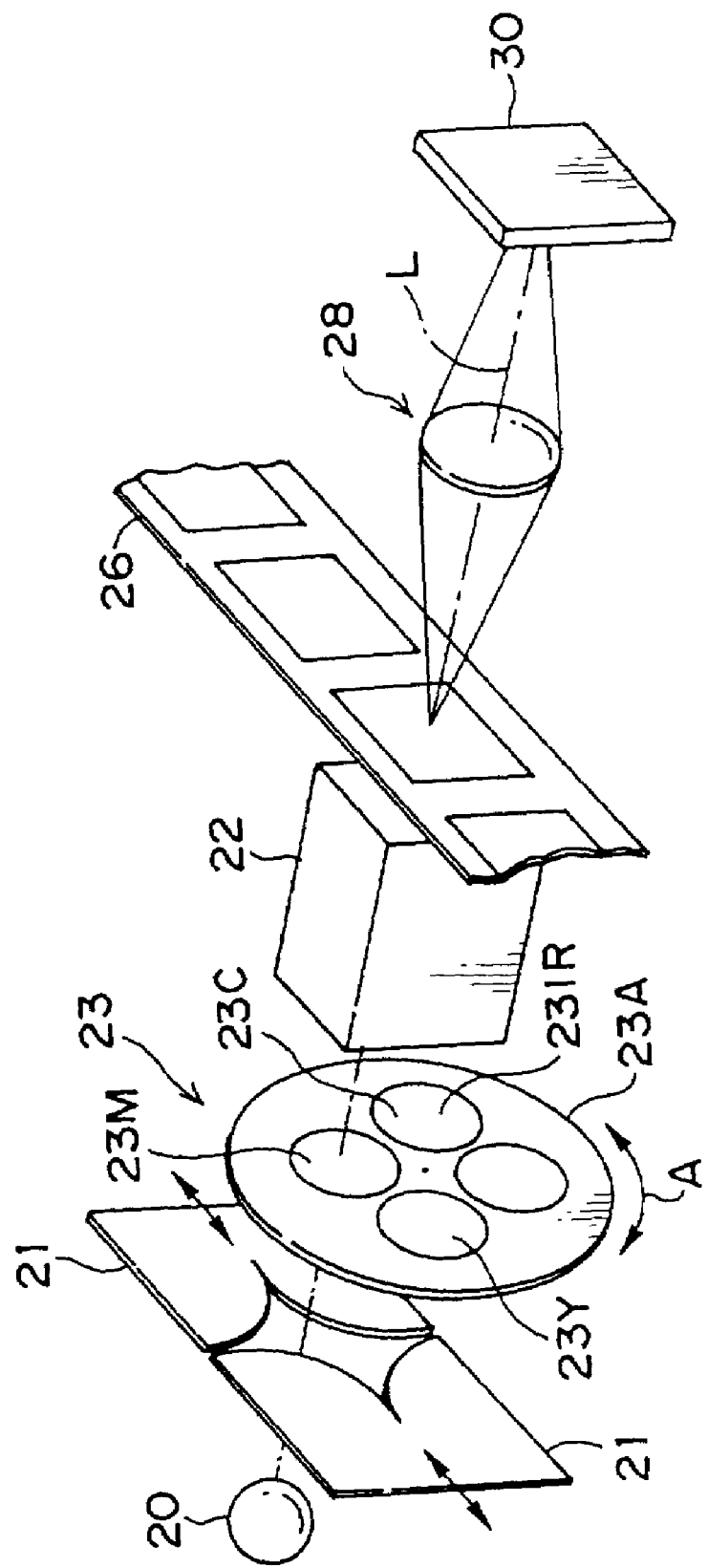
FIG. 2 is a perspective view schematically showing the structure of a film scanner.

The film scanner 12 reads an image (e.g. a negative or positive image of a photographed subject made visible by developing processing) recorded on a photographic photosensitive material (referred to below simply as a photographic film) such as a photographic film (e.g. negative or reversal). The film scanner 12 also outputs image data obtained from the reading and, as is shown in FIG. 2, is provided with a light source 20 comprising a halogen lamp or the like for irradiating light onto a photographic film 26. Note that the light emitted from the light source includes light having a wavelength in the visible light range and light having a wavelength in the infrared light range.

A diaphragm 21 for adjusting the amount of light irradiated onto the photographic film 26, a filter unit 23, and a diffusion box 22 for changing the light irradiated onto the photographic film 26 into diffused light are provided in that order on the light emission side of the light source 20. The filter unit 23 is constructed such that four filters, namely, a filter 23C that allows only that light of the irradiated light of a wavelength region that corresponds to R (i.e. R light) to be transmitted, a filter 23M that allows only that light of the irradiated light of a wavelength region that corresponds to G (i.e. G light) to be transmitted, a filter 23Y that allows only that light of the irradiated light of a wavelength region that corresponds to B (i.e. B light) to be transmitted, and a filter 23IR that allows only infrared light of the irradiated light (i.e. IR light) to be transmitted are inserted into a turret 23A that is rotatable in the directions indicated by the arrow A in FIG. 2.

On the opposite side of the photographic film 26 to the light source 20 along the optical axis L are a lens 28 for focusing light transmitted through the photographic film 26, and an area CCD 30 in that order. The area CCD 30 is a monochrome CCD in which a multiplicity of CCD cells each having sensitivity in the visible light range and the infrared light range are arranged in a matrix pattern. The light receiving surface of the area CCD 30 is positioned so as to coincide with the focal point position of the lens 28. An unillustrated shutter is provided between the area CCD 30 and the lens 28.

The area CCD 30 is connected via a CCD driver 31 to a scanner control section 33. The scanner control section 33 is provided with a CPU, ROM (e.g. ROM whose stored contents can be rewritten), RAM, and an output port. These are all connected to each other via a bus or the like. The scanner control section 33 controls the operations of each portion of the film scanner 12. The CCD driver 31 generates a drive signal for driving the area CCD 30 and controls the driving of the area CCD 30.

The photographic film 26 is transported by a film carrier 24 (see FIG. 1—omitted from FIG. 2) such that the center of an image screen is positioned at a position which matches the optical axis L (i.e. the reading position). When the image is positioned at the reading position, the scanner control section 33 rotates the turret 23A of the filter unit 23 so that all of the filters 23 including the filter 231R are positioned in sequence on the optical axis L. The scanner control section 33 also sets a charge accumulation time for the area CCD 30 in the CCD driver 31 so that the charge accumulation time corresponds to predetermined reading conditions (either reading conditions that have been fixed in advance, or reading conditions that are decided by performing a prescan), and moves the diaphragm 21 to a position that corresponds to the above reading conditions.

Consequently, light of a wavelength region that corresponds to one of the filters 23 (R or G or B or IR) is irradiated in sequence onto the image recording area on the photographic film 26. The light that is transmitted through the image recording area on the photographic film 26 is photoelectrically converted by the area CCD 30, and is output as a signal from the area CCD 30. The signal that is output from the area CCD 30 is converted by an A/D converter 32 into digital data representing the amount of transmitted light and is input into the image processing device 14.

Note that the amount of transmitted light in each of the R, G, B wavelength regions changes in accordance with the R, G, B density of the image recorded on the image recording area (if scratches or foreign matter are present on the surface of the photographic film 26, the amount of R, G, B light also changes because of these, however, the amount of transmitted IR light is not affected by the image density and is only changed by the scratches or foreign matter). Accordingly, the photoelectric conversion of the transmitted light in each of the R, G, B wavelength regions corresponds to a reading of the image, while the R, G, B data (excluding the IR data) of the data of each of the R, G, B, IR wavelength regions input into the image processing device 14 corresponds to the image information (image data) of the present invention.

A scanner correction section 36 of the image processing device 14 performs various correction processes such as darkness correction, density conversion, shading correction and the like on the input image data (and on the IR data). The output terminal of the scanner correction section 36 is connected to an input terminal of an I/O controller 38. Image data that has undergone the above various processes in the scanner correction section 36 is input into the I/O controller 38. An input terminal of the I/O controller 38 is also connected to an output terminal of an image processor 40. Image data that has been image processed (described below in detail) is input from the image processor 40 into the input terminal of the I/O controller 38.

An input terminal of the I/O controller 38 is also connected to a control section 42. The control section 42 is provided with unillustrated expansion slots to which can be connected a PC card or IC card capable of being loaded in a digital still camera (these are referred to below generically as digital camera cards), CD-ROM and MO, (unillustrated) drives for reading and writing data (or programs) on an information storage medium such as a CD-R, and communication control devices for performing communication with other information processors. Image data input from the outside via an expansion slot is input into the I/O controller 38.

An output terminal of the I/O controller 38 is connected to each of a data input terminals of the image processor 40 and the control section 42, and also to the printer 16 via an I/F circuit 54. The I/O controller 38 selectively outputs input image data to each of the devices connected to its output terminals.

In the present embodiment, two readings, each at a different resolution, are performed in the film scanner 12 on each of the images recorded on the photographic film 26. Note that, in an aspect in which an area CCD (i.e. the area CCD 30) is used as the reading sensor, such as in the present embodiment, the switching between the reading resolutions (i.e. the obtaining of image data at a different resolution for each reading) may be achieved either by, for example, performing the reading for the prescan at the same high resolution as for the fine scan and then performing a post-processing on the obtained image data such as thinning the pixels or integrating the pixels. Alternatively, a reading may be performed a plurality of times during the fine scan using an area sensor with the area sensor being moved a predetermined distance which corresponds to one integral portion of the pixel interval for each reading by an actuator such as a piezo element.

In the first reading, which is performed at a comparatively low resolution (i.e. a prescan), each image reading is performed in reading conditions (e.g. the amount of light in each of the R, G, B wavelength ranges irradiated onto the photographic film 26 and the charge accumulation time of the area CCD 30) determined such that saturation of the accumulated charge does not occur in the area CCD 30 even when the density of the image is extremely low. Note that, in the present embodiment, an IR reading is not performed during the prescan. The image data obtained from the prescan (prescan image data) is input into the control section 42 from the I/O controller.

The control section 42 is provided with a CPU 46, RAM 48, ROM 50 (e.g. ROM capable of having the contents stored thereon rewritten), and an input port 52, and these devices are connected to each other via a bus. The control section 42 calculates image feature amounts such as the image density based on the prescan image data input from the I/O controller 38, decides the reading conditions for the film scanner 12 to perform a second reading at a comparatively high resolution (i.e. a fine scan) of each image, and outputs the decided reading conditions for each image to the film scanner 12.

The control section 42 performs the calculation of image feature amounts including the extraction of the principal image area (e.g. an area corresponding to the face of a person (—the facial area)) from the image based on the prescan image data. The control section 42 then automatically decides by calculation (set up calculation) the processing conditions for the various image processings performed on the image data obtained when the film scanner 12 performs the fine scan (i.e. fine scan image data), and outputs the decided processing conditions to the image processor 40.

Note that the control section 42 has a function for finding out whether or not a defect portion caused by a scratch or foreign matter such as dust on the surface of the photographic film 26 is present in an image represented by the image data based on the IR data input from the film scanner 12. The control section 42 also has the function of setting the parameters for the image processor 40 to perform processing to correct any defect portion. A display unit 43, a keyboard 44, and an unillustrated mouse are also connected to the bus of the control section 42.

On the basis of the calculated image processing conditions, the control section 42 generates simulation image data by performing image processing on the prescan image data that is equivalent to the image processing to be performed by the image processor 40 on the fine scan image data. The simulation image data thus generated is converted into signals for displaying an image on the display unit 43, and a simulation image is displayed on the display unit 43 on the basis of these signals. In addition, an examination of the image quality of the displayed simulation image can be performed by an operator or the like, and information instructing corrections of the processing conditions can be input via the keyboard 44 or the mouse as a result of this examination. Recalculation and the like of the image processing conditions can then be performed on the basis of this input information.

By performing the fine scan on the image in the film scanner 12, the image data input into the I/O controller 38 (the fine scan image data) is output from the I/O controller 38 to the image processor 40.

The image processor 40 is provided with image processing circuits for performing various types of image processing such as color and density correction processing including gradation conversion and color conversion, pixel density conversion processing, hyper tone processing to compress the gradation of ultra low frequency brightness components of an image, hyper sharpness processing to enhance sharpness while suppressing graininess, and the like. The image processor 40 performs the various image processings on input image data in accordance with the processing conditions for each image decided and forwarded by the control section 42. The image processor 40 also has the function of performing defect correction processing in accordance with the parameters set by the control section 42.

When the image data which has undergone image processing in the image processor 40 is to be used for recording an image on printing paper, the image data that has been image processed in the image processor 40 is output from the I/O controller 38 to the printer 16 via the I/F circuit 54 as image data for recording. When image data that has been image processed is output to the outside as an image file, the image data is output from the I/O controller 38 to the control section 42. Consequently, in the control section 42, the image data input from the I/O controller 38 for output to the outside is output to the outside (i.e. to the aforementioned drive or communication control device) via an expansion slot as an image file.

The printer 16 is provided with image memory 58, R, G, B laser light sources 60, and a laser driver 62 for controlling the operation of the laser light sources 60. The image data for recording that has been input from the image processing device 14 is temporarily stored in the image memory 58, read, and then used to modulate the R, G, B laser light emitted from the laser light sources 60. The laser light emitted from the laser light sources 60 is scanned onto printing paper 68 via a polygon mirror 64 and an fθ lens 66, and an image is thereby recorded by exposure on the printing paper 68. The printing paper 68 on which the image has been exposure recorded is transported to a processor section 18 where it undergoes color developing, bleaching and fixing, washing, and drying processes. As a result of this, the image that was exposure recorded on the printing paper 68 is visualized.

Next, a description will be given of the defect portion correction values deciding processing executed by the control section 42 when fine scan image data is input from the scanner 12 into the image processing device 14.

The defect portion correction values deciding process is a process in which the image processing methods described in the thirteenth through fifteenth aspects are applied. This process is achieved through a defect portion correction value deciding program being executed by the CPU 46 of the control section 42. The defect portion correction values deciding program is at first stored on an information storage medium 72 (see FIG. 1) together with programs for executing other processes using the CPU 46. Note that, in FIG. 1, the information storage medium is shown as a floppy disk, however, it may also be formed from a CD-ROM, memory card, or the like.

The information storage medium 72 is loaded in an unillustrated information reading device that is connected to the control section 42. When an instruction is given to install a program from the information storage medium 72 onto the image processing device 14, the defect portion correction values deciding program or the like is read from the information storage medium 72 by the information reading device and is recorded on a rewriteable ROM 50. When the time arrives for the defect portion correction values deciding program to be executed, the defect portion correction values deciding program is read from the ROM 50 and executed by the CPU 46.

Accordingly, the image processing device 14 functions as the image processing device described in the first aspect, the eighth aspect, and the eleventh aspect of the present invention. In this way, the information storage medium 72, on which are stored the defect portion correction values deciding program and the like, corresponds to the recording medium described in the sixteenth through eighteenth aspects of the present invention.

A description will now be given of the defect portion correction values deciding process with reference made to the flow chart shown in FIG. 3. In step 100, the R, G, B image data and the IR image data of a single image (i.e. the image to be processed) input into the control section 42 are imported into the RAM 48 or the like. Next, in step 101, transverse chromatic aberration correction to correct shifts in pixel positions in the R, G, B, IR image data caused by transverse chromatic aberration of the lens 28 of the film scanner 12 is performed on the imported image data and IR data.

In the transverse chromatic aberration correction, for example, the direction in which the pixel positions of non-reference wavelength regions (e.g. R, B, IR) change because of transverse chromatic aberration of the lens 28 and the amount of this change (transverse chromatic aberration amount) relative to the pixel positions of a reference wavelength region (e.g. G) at each position on an image are measured in advance and stored as transverse chromatic aberration correction data. The value of each pixel represented by data of a non-reference wavelength region is regarded as a value for a position offset in a change direction represented by the transverse chromatic aberration correction data by a change amount represented by the transverse chromatic aberration correction data relative to the original pixel position. Accordingly, the value in the original pixel position is determined for the data of each non-reference wavelength region.

In step 102, based on the R, G, B image data and the IR data imported into the RAM 48 and the like, defect portion detection processing to detect defect portions in the image being processed represented by the R, G, B image data is performed. Firstly, a description will be given of the principle of the detection of locations where scratches and foreign matter are present ion a photographic film using IR light, followed by a description of the defect portion detection processing.

As is shown in FIG. 4A, the amount of transmitted light when light is irradiated onto locations where no scratches or foreign matter are present on the surface of a photographic film is attenuated by an attenuation amount that corresponds to the light absorption by the photographic film of the amount of light irradiated onto the photographic film. Note that the wavelength region where light is absorbed by the photographic film is likely to be the visible light region, and there is practically no absorption of IR light from the infrared region. Therefore, the amount of transmitted light when IR light is irradiated onto locations where the scratches or foreign matter are not present only changes slightly from the amount of light that was irradiated.

If, however, light is irradiated onto locations where a scratch or foreign matter is present on a photographic film, a portion of the irradiated light is refracted by the scratch. Therefore, the amount of transmitted light (i.e. the amount of light that passes directly through such a location) when light is irradiated onto the locations where scratching is present is attenuated, relative to the amount of light irradiated onto the photographic film, by an attenuation amount which is a sum of the attenuation caused by absorption of the light by the photographic film and the attenuation caused by the light refraction due to the scratching. Note that FIG. 4A shows an example in which a scratch is present on the light incident side, however, the same phenomenon is evident when the scratch is present on the light exiting side.

Light refraction caused by scratches is also generated for IR light. Therefore, the amount of transmitted IR light when IR light is irradiated onto a location where a scratch is present is attenuated by an attenuation amount that corresponds to the attenuation caused by the light refraction due to the scratch. Note that, as is also shown in the example in FIG. 4B, because the light refraction due to a scratch is more marked (both for visible light and IR light) as the scale of the scratch (i.e. the depth and the like) increases, the amount of transmitted light when IR light is irradiated onto a location where the scratch is present is reduced as the scale of the scratch is increased. Consequently, it is possible to detect the scale of the scratch present on the photographic film based on the amount of attenuation in the amount of transmitted IR light.

When light is irradiated onto a location where foreign matter such as dust and the like is present on the photographic film, the irradiated light is reflected by the foreign matter. Therefore, depending on the size and type (i.e. light transmission ratio) of the foreign matter, the amount of transmitted light when light is irradiated onto a location where the foreign matter is present is greatly attenuated by the foreign matter. The attenuation of the amount of transmitted light when light is transmitted onto a location where foreign matter is present is the same as when IR light is irradiated onto that location.

As described above, the amount of transmitted light when IR light is irradiated onto a photographic film only changes in locations where scratches or foreign matter are present on the photographic film. Moreover, because the amount of transmitted IR light is not affected by changes in the transmission density of images that are recorded on the photographic film, by irradiating IR light onto the photographic film and detecting the amount of transmitted light, it is possible to detect scratches and foreign matter present on the photographic film.

Figure 5A:
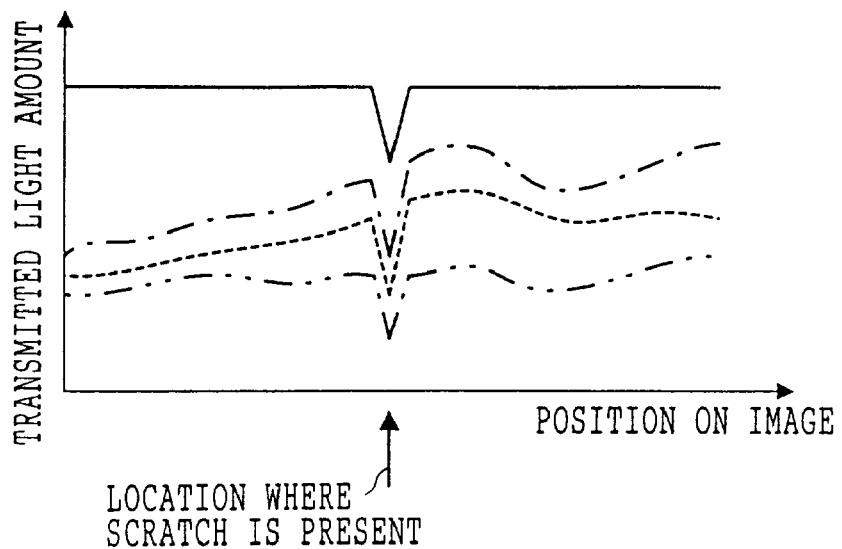
FIG. 5A is a line drawing showing an example of a change in the amount of R, G, B, and IR transmission light when scratches are present on the back surface of a photographic film.
Figure 5B:
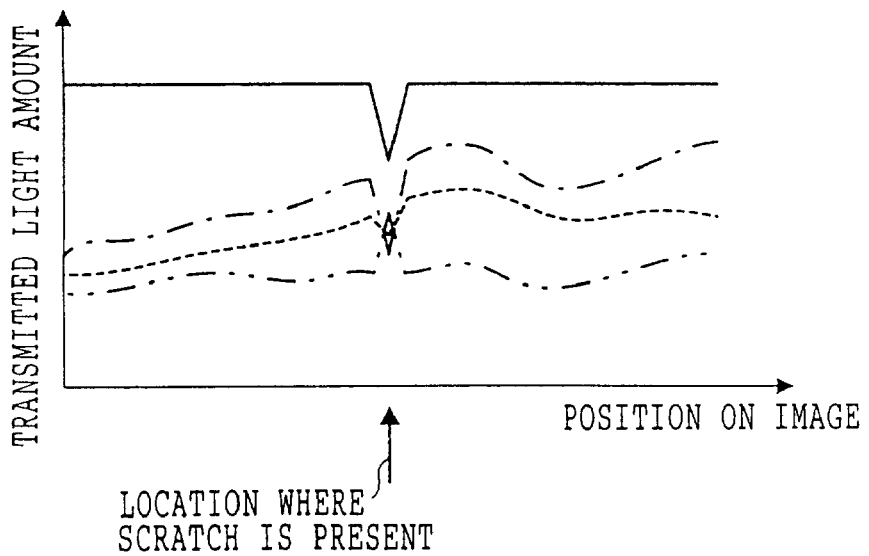
FIG. 5B is a line drawing showing an example of a change in the amount of R, G, B, and IR transmission light when scratches are present on the emulsion surface of a photographic film.

On the basis of the above, the defect portion detection process is performed in step 102 as described below. The amount of transmitted light when IR light is irradiated onto the photographic film is normally substantially the same regardless of the position on the image, as described above, and is only decreased in locations where scratches or foreign matter is present on the photographic film (see FIGS. 5A and 5B). Because the IR data represents the amount of transmitted IR light at each position on the image being processed, the amount of transmitted IR light represented by the IR data at locations where no scratches or foreign matter are present on the image being processed (e.g. the maximum value of the amount of transmitted light) is set as a reference value. In comparison with the reference value of the amount of transmitted IR light in each pixel, all those pixels in which the amount of transmitted light changes above a predetermined value (a value that has been determined with the slight variations in the amount of transmitted IR light in locations where scratches or foreign matter are not present taken into account) relative to the reference value are then detected as defect pixels that belong to the defect portion being corrected.

In step 102, the detected defect pixels are then classified as defect pixels belonging to the same defect portion on the basis of the positional relationship between mutual defect pixels (e.g. on whether or not the pixels are contiguous to each other), and information relating to each defect portion (for example, information representing defect pixels belonging to each defect portion, and information on the amount of the reduction in the amount of transmitted IR light in each defect pixel and the like) is stored in the RAM 48. Step 102 corresponds to the film scanner 12 for measuring the amount of IR light transmitted through a photographic film, and also to the detection device (specifically, the detection device according to the second aspect) of the present invention.

In step 104, a single defect portion is selected for processing from among the defect portions detected by the defect portion detection processing in step 102. In the present embodiment, the interpolation method and the brightness adjustment method are prepared as correction methods for correcting defect portions, and in step 106, predetermined feature amounts for selecting which out of the interpolation method or the brightness adjustment method is to be applied (or for deciding the application ranges of both correction methods) to the correction of the selected defect portion to be processed. An example of a predetermined feature amount is a feature amount representing the correlation between changes in the R, G, B density (changes in the amount of transmitted light) in areas adjacent to the defect portion.

As is shown in FIG. 4B, the emulsion layer of a photographic film is formed from R, G, B photosensitive layers. A photographic film (a negative film) on which an image has been exposure recorded and which has undergone processings such as developing and the like has a C negative image formed on the R photosensitive layer, an M negative image formed on the G photosensitive layer, and a Y negative image formed on the B photosensitive layer. Out of the visible light transmitted through the photographic film, the R light is attenuated (absorbed) by an attenuation amount that corresponds to the transmission density of the C negative image in the R photosensitive layer, the G light is attenuated (absorbed) by an attenuation amount that corresponds to the transmission density of the M negative image in the G photosensitive layer, and the B light is attenuated (absorbed) by an attenuation amount that corresponds to the transmission density of the Y negative image in the B photosensitive layer.

In this case, when, as is shown in FIG. 4B, a scratch is present on the back surface on the opposite side to the emulsion layers, the ratio of the light absorption in each of the R, G, B photosensitive layers of the transmitted light is the same as when no scratch is present. Namely, in FIG. 4B, if the amount of light incident onto the photographic film is set as $I_0$ and the amounts of transmitted R, G, B light when no scratch is present are set respectively as $I_{0R}$, $I_{0G}$, and $I_{0B}$, then when a scratch is present, if the amount of light transmitted directly through the location where the scratch is present so as to be incident on the emulsion layer is set as $I_1$ (the light attenuation portion caused by scratches is $I_1 < I_0 : I_0 - I_1$), and the amounts of transmitted R, G, B light when a scratch is present are set respectively as $I_{1R}$, $I_{1G}$, and $I_{1B}$, then the relationships in the following formula (1) are established.

$$I_{0R}/I_0 \approx I_{1R}/I_1, I_{0G}/I_0 \approx I_{1G}/I_1, I_{0B}/I_0 \approx I_{1B}/I_1 \qquad (1)$$

Thus, when scratches are present on the back surface, the amounts of transmitted R, G, B light in the location where the scratch is present are less than when no scratch whatsoever is present (the same applies for the amount of transmitted IR light). As is clear from formula (1), only the brightness changes in defect portions corresponding to locations where scratches are present on the back surface compared with when no scratches are present, and the color information of the image recorded on the photographic film is preserved. Therefore, by applying the brightness adjustment method and adjusting the brightness of the defect portion areas, it is possible to correct a defect portion of an image represented by image data.

In contrast, as is shown in the example in FIG. 4C, when the scratch is present on the emulsion surface, if the scratch is shallow, because a portion of a photosensitive layer (dye layer) is shaved off (is damaged) from the photosensitive layers, the ratio of the light absorption in each of the R, G, B photosensitive layers of the transmitted light changes from when no scratch is present. Moreover, if the scratch is extremely deep such as when each photosensitive layer is completely torn away, there is no light absorption in the each of the photosensitive layers of the transmitted light. As a result, in either case, the relationships of formula (1) are not established.

Note that, even when a scratch is present on the emulsion surface, the amount of transmitted IR light in the location where the scratch is present is less than when no scratch whatsoever is present. On the other hand, when a scratch is present on the emulsion surface, although the amount of transmitted light in the wavelength region corresponding to the R, G, B photosensitive layer on which no scratch is present is reduced, the amount of transmitted light in the wavelength region corresponding to the damaged photosensitive layer generally increases (naturally, this also depends on the extent of the light attenuation caused by the scratch and the like).

Thus the color and brightness of defect portions that correspond to locations where a scratch is present on the emulsion surface both change compared to when no scratch is present regardless of the depth of the scratch, and color information of the image recorded on the photographic film is lost. Consequently, it is difficult to accurately correct the defect portion even by adjusting the brightness. Therefore, a correction method in which the brightness and density of the defect portion are decided by interpolation from information of areas surrounding the defect portion (i.e. an interpolation method) is applied to the correction of a defect portion that corresponds to a location where a scratch is present on the emulsion surface. Note that, because the brightness and density both change in defect portions caused by foreign matter present on the photographic film in comparison with when no foreign matter is present, such defects are also corrected using the interpolation method.

As described above, because the light in the R, G, B wavelength regions is reduced in a substantially uniform proportion in each part of a defect portion caused by a scratch present on the back surface of a photographic film, the amount of the change in the R, G, B densities in the defect portion in the image data is substantially uniform. In contrast to this, because the above proportion is not uniform in a defect portion caused by a scratch or foreign matter present on the emulsion surface of a photographic film, the amount of the above change in the densities is also not uniform. As a result, if a feature amount representing the correlation between the R, G, B density changes in the defect portion is used as the predetermined feature amount, then based on the result of the calculation of the feature amount, it is possible to determine whether the defect portion being processed is a defect portion caused by a scratch on the back surface (and therefore is a defect portion that should be corrected using the brightness adjustment method), or whether the defect portion being processed is a defect portion caused by a scratch or foreign matter on the emulsion surface (and therefore is a defect portion that should be corrected using the interpolation method).

Note that, instead of a feature amount representing the correlation of the changes in the R, G, B density in a defect portion, it is also possible to use a feature amount representing the correlation between the change in the amount of transmitted IR light in the area surrounding the defect portion and the changes in the amounts of transmitted R, G, B light in the area surrounding the defect portion. Specifically, the gain GainX determined from formula (4) below can be used as the feature amount representing this correlation. The gain GainX is calculated for each defect pixel belonging to the defect portion being processed and if the results of the calculation are all within a predetermined numerical value range (e.g. 0.6 to 1.5), it can be determined that the correlation is strong and either the brightness adjustment method is then selected or the proportion of the brightness adjustment method that is applied is then increased. If there are defect pixels that are not within the predetermined numerical value range, it can be determined that the correlation is weak, and either the interpolation method is then selected or the proportion of the interpolation method that is applied is then increased.

It is also possible to use edge intensity and texture intensity in the areas surrounding the defect portion as a predetermined feature amount. Namely, in the interpolation method, interpolation is performed from density changes in the areas surrounding a defect portion on the assumption that the density of the original image within the defect portion and in the areas surrounding the defect portion changes smoothly and continuously. Therefore, the accuracy of the interpolation calculation is reduced in cases such as when an edge having a high edge intensity is present around the defect portion and the like, and it becomes difficult to accurately correct the defect portion. Accordingly, if the edge intensity in an area surrounding a defect portion is used as a predetermined feature amount, then it becomes possible, based on the result of calculating the feature amount, to determine whether the defect portion being processed should be corrected using the brightness adjustment method or should be corrected using the interpolation method. The edge intensity in the area surrounding a defect portion can also be determined from the density distribution in the area surrounding the defect portion.

When viewing an image in which texture is present, portions with different textures are classified as different image areas. Therefore, when the correction of a defect portion having clearly discernible texture present in the area surrounding the defect portion has not been successful, this is clearly evident. The brightness adjustment method, in which unevenness in the defect portion correction accuracy is comparatively low, is applied to the correction of this type of defect portion as well. Accordingly, if the texture intensity in the area surrounding a defect portion is used as a predetermined feature amount, then it is possible, based on the result of calculating the feature amount, to determine whether the defect portion being processed should be corrected using the brightness adjustment method or should be corrected using the interpolation method.

Note that, as the texture intensity of an area surrounding a defect portion, it is possible to use, for example, a statistical amount determined using at least one of a known density histogram that is a typical statistical method for calculating a texture feature, a co-occurrence matrix, a differential statistical amount, a run-length matrix, a power spectrum, and the like. It is also possible to determine the above statistical amount from the density distribution in the area surrounding the defect portion.

Furthermore, it is also possible to use the existence or otherwise of a defect portion within a principal area of an image (or the proportion of the defect portion that overlaps with a principal area) as a predetermined feature amount. Namely, because a principal area in an image (for example, an area that corresponds to the face of a person) receives the most attention when viewing the image, the brightness adjustment method, in which unevenness in the defect portion correction accuracy is comparatively slight, is applied to the correction of a defect portion that is within the principal area, or to the correction of a defect portion that overlaps with the principal area. Consequently, if the presence or otherwise of a defect portion within a principal area of an image, or the proportion of the defect portion that overlaps with a principal area is used as a predetermined feature amount, then it is possible, based on the result of calculating the feature amount, to determine whether the defect portion being processed should be corrected using the brightness adjustment method or should be corrected using the interpolation method.

Moreover, it is also possible to use the amount of transmitted IR light in an area surrounding a defect portion as a predetermined feature amount. Namely, because a large-scale defect portion (for example, a defect portion corresponding to a large scratch or piece of foreign matter, or to a deep scratch or piece of foreign matter that does not have light transmission properties) stands out if the correction result is inappropriate, the brightness adjustment method, in which unevenness in the defect portion correction accuracy is comparatively slight, is applied to the correction of this type of defect portion. Because the scale of a defect portion can be determined from the amount of transmitted IR light in the area surrounding the defect portion or from changes therein, if the amount of transmitted IR light (or a feature amount representing the scale of the defect portion obtained from the amount of transmitted IR light) is used as an image feature, then it is possible, based on the result of calculating the feature amount, to determine whether the defect portion being processed should be corrected using the brightness adjustment method or should be corrected using the interpolation method.

Note that, naturally, in step 106, it is possible to calculate, as the predetermined feature amount, a plurality of types of feature amount from among the above-described various feature amounts.

When calculating a predetermined feature amount in the above-described manner, in the next step 108, based on the predetermined feature calculation result, either the interpolation method or the brightness adjustment method is selected as the correction method to be used for correcting the defect portion being processed, or a decision is made as to what extent each method should be applied (application proportion) if the interpolation method and the brightness adjustment method are both to be used for correcting the defect portion being processed. Note that step 108 corresponds to the deciding device (specifically, the deciding device of the third and fourth aspects) of the present invention, in the same way as the above-described step 106.

Figure 6A:
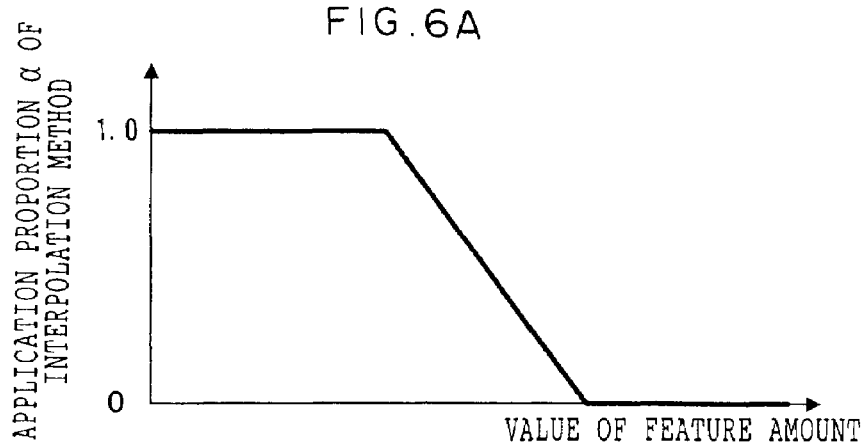
FIG. 6A is a line drawing showing an example of a map for selecting the correction method to be applied or deciding the application range from a result of a calculation of the amount of features of a defect portion.

The selecting of the correction method or the deciding of the application ranges of the correction methods in step 108 can be performed using, for example, a map representing the relationship between the value of the predetermined feature amount and the interpolation method application proportion $\alpha$ (the application proportion of the brightness adjustment method may also be used), as is shown in FIG. 6A. Note that in the map in FIG. 6, the range $\alpha=1$ represents selecting the interpolation method only in order to correct the defect portion, while the range $\alpha=0$ represents selecting the brightness adjustment method only in order to correct the defect portion. In the range $0<\alpha<1$, the interpolation method is applied in an application range of "application proportion=$\alpha$", while the brightness adjustment method is applied in an application range of "application proportion=(1−α)". By performing the above correction method selection/application range deciding in accordance with the value of the predetermined feature amount calculated in step 106, the correction method to be applied can be selected or the optimum application ranges of each correction method can be decided such that the defect portion being processed is accurately corrected.

Figure 6B:
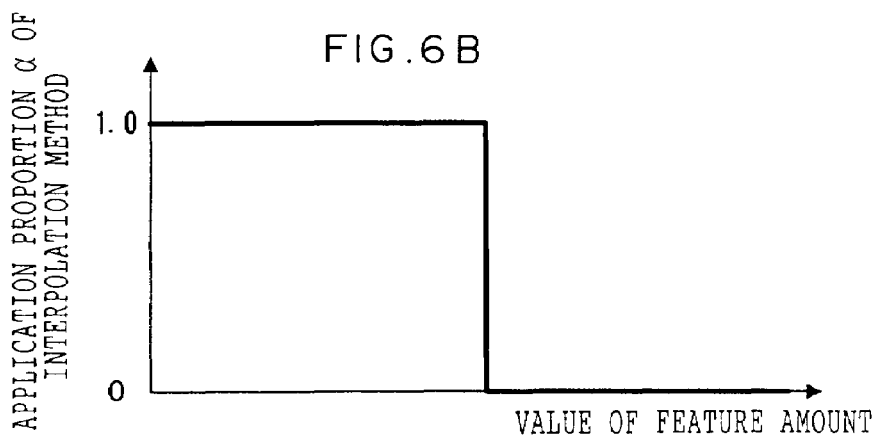
FIG. 6B is a line drawing showing an example of a map for selecting the correction method to be applied or deciding the application range from a result of a calculation of the amount of features of a defect portion.
Figure 6C:
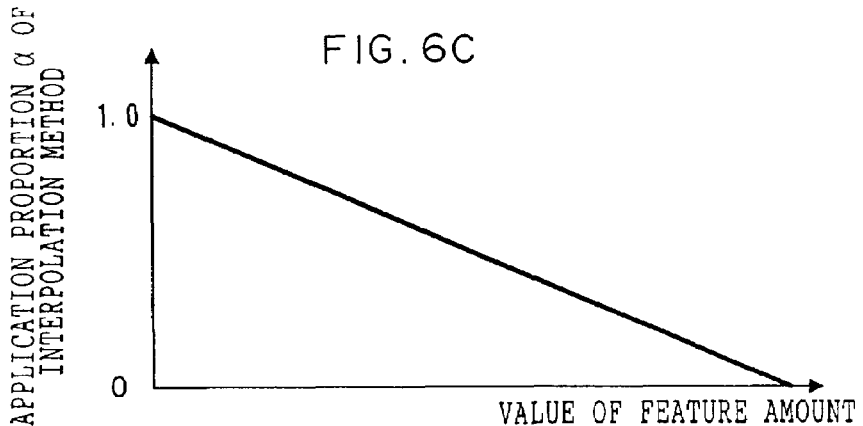
FIG. 6C is a line drawing showing an example of a map for selecting the correction method to be applied or deciding the application range from a result of a calculation of the amount of features of a defect portion.

Note that, in step 108, it is also possible to use the maps shown in FIGS. 6B and 6C instead of the map shown in FIG. 6A. In the map shown in FIG. 6B, because either the value 0 or the value 1 is set for the application proportion α, one of either the interpolation method or the brightness adjustment method is selected as the correction method. Moreover, in the map shown in FIG. 6C, in most cases, the value of the application proportion α is in the range 0<α<1, therefore, both the interpolation method and the brightness adjustment method are applied as the correction method. Note that it is also possible to use a map in which the value of the application proportion α changes non-linearly relative to the change in the value of the feature amount.

Figure 7A:
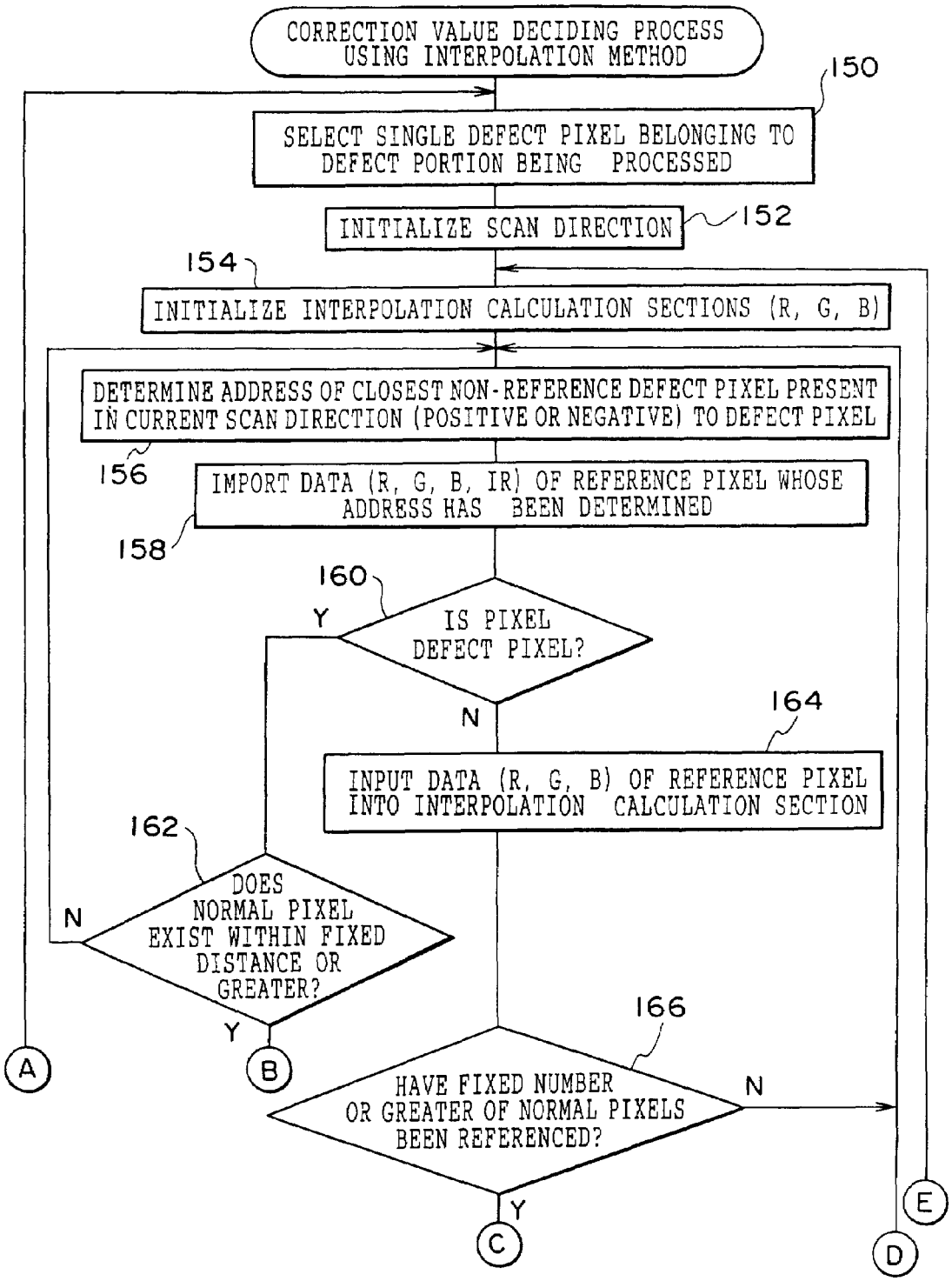
FIGS. 7A and 7B are flow charts showing the contents of processing to decide correction values using the interpolation method.
Figure 7B:
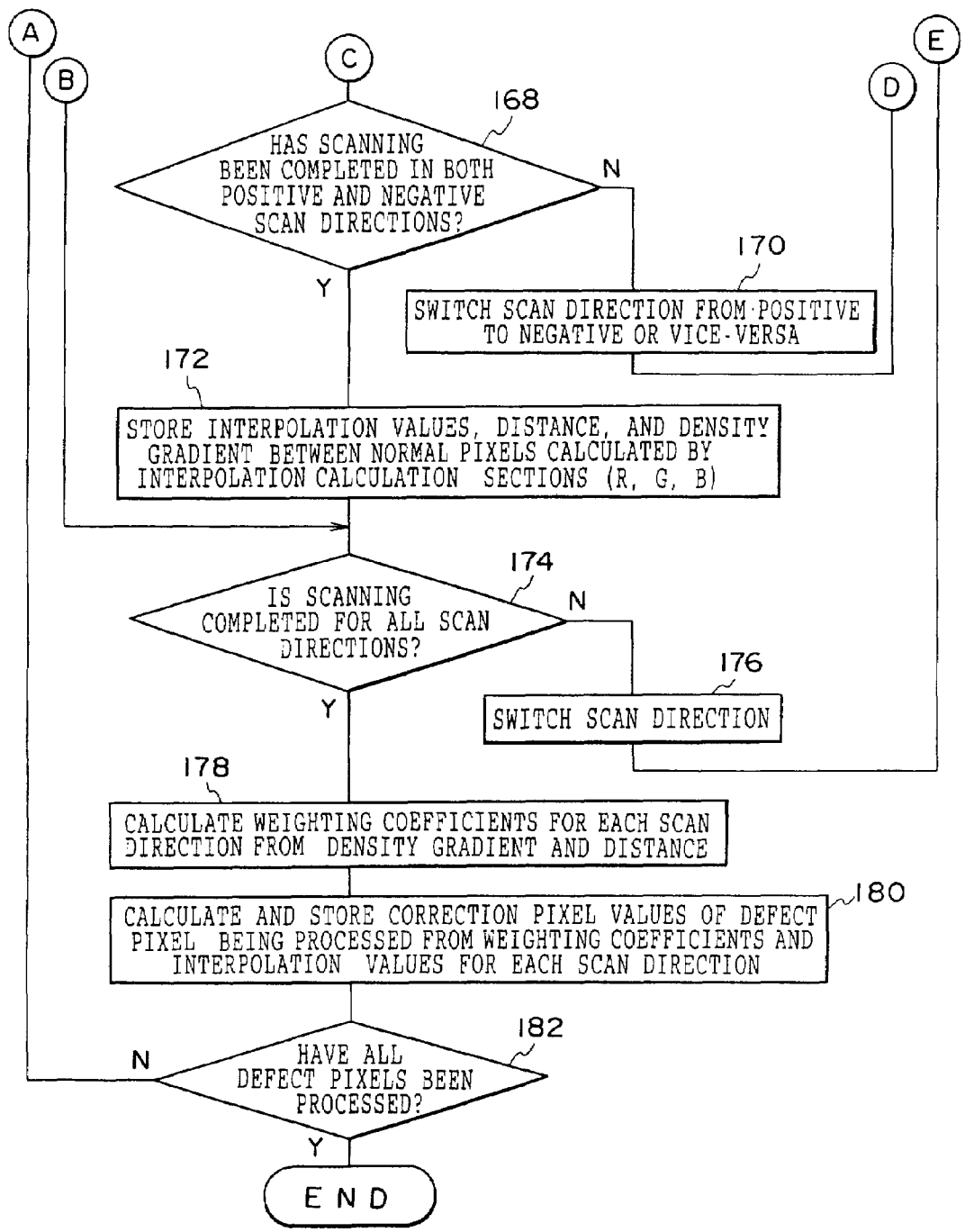

In the next step 110, a determination is made as to whether or not to apply the interpolation method to the correction of the defect portion being processed. If the application proportion α=0, the determination is negative and the routine proceeds to step 114. If, however, the application proportion α≠0, the determination is affirmative and the routine proceeds to step 112 where correction value deciding processing is performed using the interpolation method. A description will now be given with reference made to the flow chart in FIGS. 7A and 7B of the correction value deciding processing using the interpolation method.

In step 150, a single defect pixel is selected as the defect pixel to be processed from among all the defect pixels belonging to the defect portion being processed. In the next step 152, the scan direction (search direction) is initialized. In the correction value deciding processing using the interpolation method according to the present embodiment, as is shown by the plurality of arrows in the example in FIG. 8, a scan is made in a plurality of directions radiating outwards from the defect pixel being processed, and interpolation values and the amounts of each image feature over the distance between normal pixels and the density gradient are calculated for each direction (described in detail below). The initialization in step 152 is performed by setting a predetermined direction from among the plurality of directions as the current scan direction (i.e. as the initial scan direction).

In the next step 154, the interpolation calculation sections are initialized. When normal pixel data (i.e. data of a pixel not belonging to a defect portion) is input, the interpolation calculation sections hold the input data and, on the basis of this input data, are sub-routines for performing the above calculations of the density gradient, distance between normal pixels, and interpolation values. An interpolation calculation section is prepared for each of the colors R, G, B. The interpolation calculation sections perform these calculations separately for each color R, G, B. The initialization in step 154 is achieved by clearing the data held in each interpolation calculation section.

In step 156, as the address of the pixel to be referenced, the address of a non-reference pixel that, relative to the defect pixel being processed, is present in a direction corresponding to the current scan direction and is closest on the image in distance to the defect pixel (initially, the pixel that is adjacent in the current scan direction to the defect pixel being processed) is determined.

Figure 8:
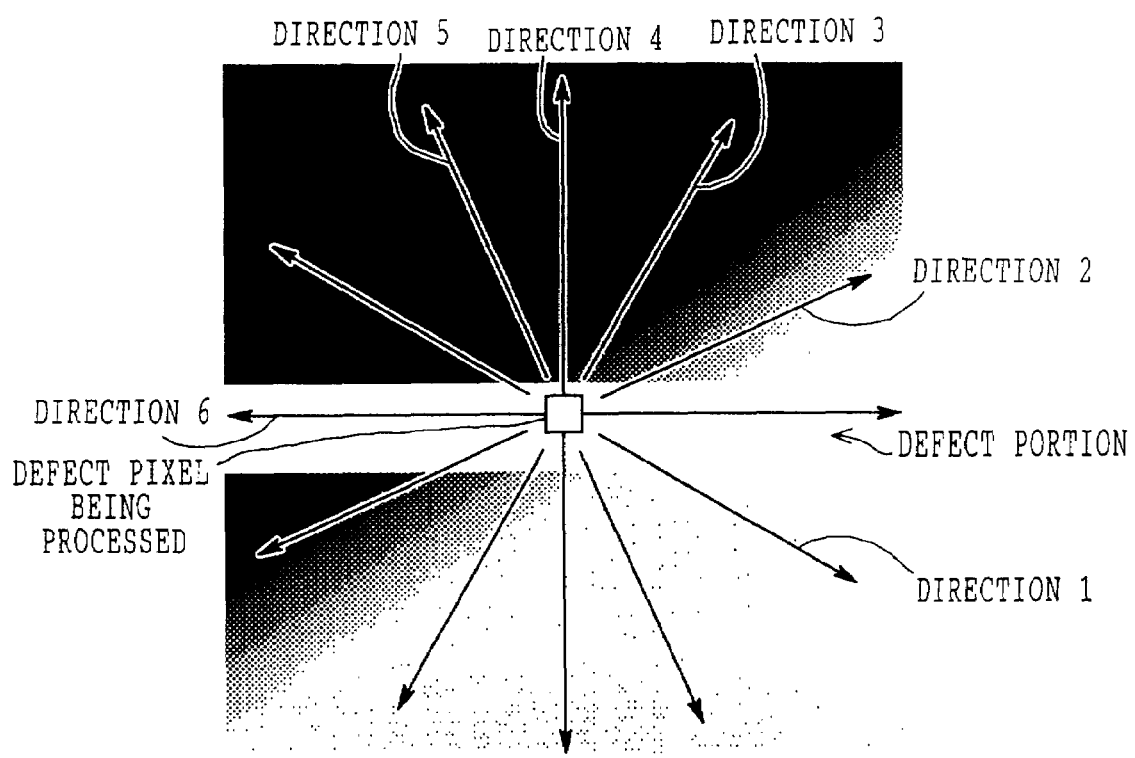
FIG. 8 is a schematic diagram showing an example of the scan directions used in the processing of FIG. 7.

Note that, in the present embodiment, a direction along a straight line extending through the defect pixel being processed, as shown in FIG. 8, is defined as the scan direction, however, because the actual scan is performed in the straight line in a direction going away from the defect pixel being processed, two scans are performed in scanning directions 180° opposite each other along a single scan direction (for convenience, the two scans will be referred to as being in a positive direction and a negative direction). Therefore, in step 156, specifically, a determination is made as to whether the current scan is in the positive direction or the negative direction (the positive and negative directions are also initially set when the scan direction is set), and the address of a non-reference pixel in the determined direction is determined.

In step 158, the R, G, B, IR data of the pixel whose address was determined in step 156 (i.e. the reference pixel) is imported. In the next step 160, based on the IR data imported in step 158, a determination is made as to whether or not the reference pixel is a defect pixel. Note that, instead of referring to the IR data, in the defect portion detection process (step 102 of the flowchart shown in FIG. 3), it is also possible to perform the above determination by labeling all the pixels in the image as being defect pixels or normal pixels and then referring to the results of the determination.

If the determination in step 160 is affirmative, the routine proceeds to step 162 where a determination is made as to whether or not a normal pixel was detected regardless of whether the scan was performed over a fixed distance. If this determination is negative, the routine returns to step 156 and the processings and determinations of step 156 and thereafter (a scan in the same scan direction) are repeated.

In step 160, if the reference pixel is a normal pixel, the determination is negative and the routine proceeds to step 164 where the R, G, B data of the reference pixel imported in step 158 is input into each interpolation calculation section. Note that the input data is held in each interpolation calculation section. In the next step 166, a determination is made as to whether or not a fixed number or greater of normal pixels have been referenced. If this determination is negative, the routine returns to step 156 and a scan is repeated in the same direction.

If a fixed number or greater of normal pixels have been referenced (i.e. if data of a fixed number of normal pixels or greater has been input into the interpolation calculation sections), the determination in step 166 is affirmative and the routine proceeds to step 168. In step 168, a determination is made as to whether or not a scan has been performed in both the positive and negative directions for the current scan direction. If this determination is negative, the routine proceeds to step 170 where the routine returns to step 156 after the scan direction has been switched to either the positive or negative direction. As a result, a scan is performed in a scan direction 180° from the previous scan direction.

Figure 9A:
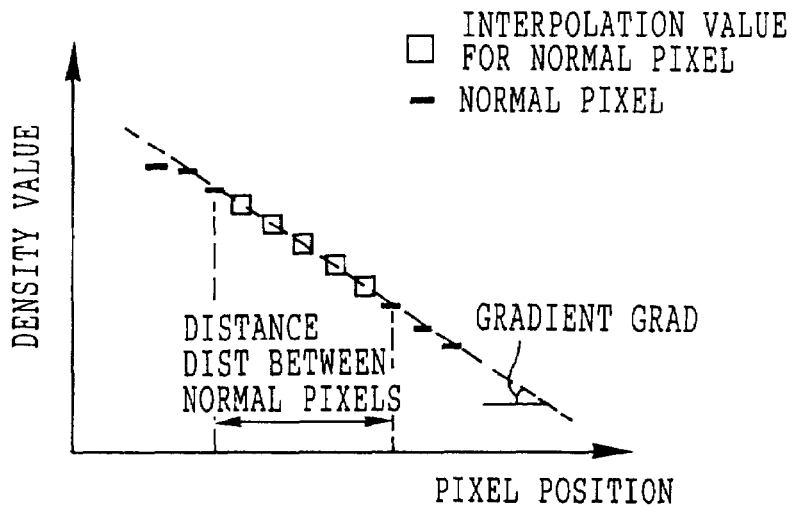
FIG. 9A is a line drawing for describing an interpolation calculation of a pixel value of a defect pixel from a pixel value of a normal pixel.

If a fixed number or greater of normal pixels are referenced in each of the scans in the positive and negative directions for the current scan direction, the determinations in both steps 166 and 168 are affirmative and the routine proceeds to step 172. At this time, the data of each of the fixed number or greater of normal pixels (the normal pixels shown by [□] in FIG. 9A) positioned on both sides of the defect portion along the scan direction sandwiching the defect portion are input into the interpolation calculation sections. The interpolation calculation sections are thus in a state of being able to perform a calculation at a set calculation accuracy or greater.

Therefore, in step 172, the interpolation calculations of the pixel values (the density values for each color R, G, B—shown as a in FIG. 9A) of the defect pixels are performed by the interpolation calculation sections. This interpolation calculation can be performed by applying the least squares method or the like. Subsequently, an interpolation value VALUEx (i) (wherein, i is a symbol for identifying the scan direction, and x represents one of R, G, B) for the pixel value of the defect pixel being processed is imported as a result of the calculation. Also imported are the gradient GRAD (i) (an absolute value) of the density gradient calculated in the interpolation calculation process, and the distance DIST (i) between normal pixels (see FIG. 9A), and the imported data is stored.

In the next step 174, a determination is made as to whether or not scanning has been performed in all the scan directions. If this determination is negative, the current scan direction is changed in step 176 and then the routine returns to step 154. Accordingly, a distance DIST (i), a gradient GRAD (i), and an interpolation value VALUEx (i) for the pixel value of the defect pixel being processed are each calculated and stored for each of the plurality of scan directions.

Note that, as is the case for "direction 6" shown in FIG. 8, when the scan direction substantially matches the direction in which the defect portion extends (shown by the white region in FIG. 8), normal pixels are not detected even if the scan is performed over a fixed distance or greater. Therefore, by making a positive determination in step 162 and the process then returning to step 174, the scan in this scan direction is ended. As a result, it is possible to shorten the processing time.

Note also that steps 152 to 176 together with the interpolation calculation sections correspond to the feature amount calculation device and individual correction value calculation device described in the eighth aspect (specifically, to the feature amount calculation device and individual correction value calculation device described in the ninth and tenth aspects) of the present invention.

Once the scanning has ended in all the scan directions, the determination in step 174 is affirmative and the routine proceeds to step 178. In step 178, a weighting coefficient is calculated for each scan direction based on the gradient GRAD (i) of the density gradient and the distance DIST (i) between normal pixels calculated and stored for each scan direction. In the present embodiment, the weighting coefficient M (i) for each scan direction is calculated in accordance with the following formula (2).

$$M(i)=Mg(\text{GRAD}(i))\times Md(\text{DIST}(i)) \quad (2)$$

Figure 9B:
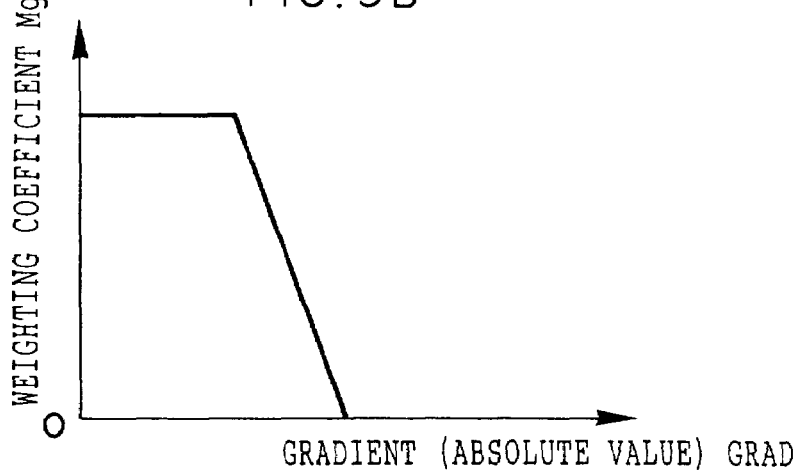
FIG. 9B is a line drawing showing the relationship between a gradient GRAD and a weighting coefficient Mg.
Figure 9C:
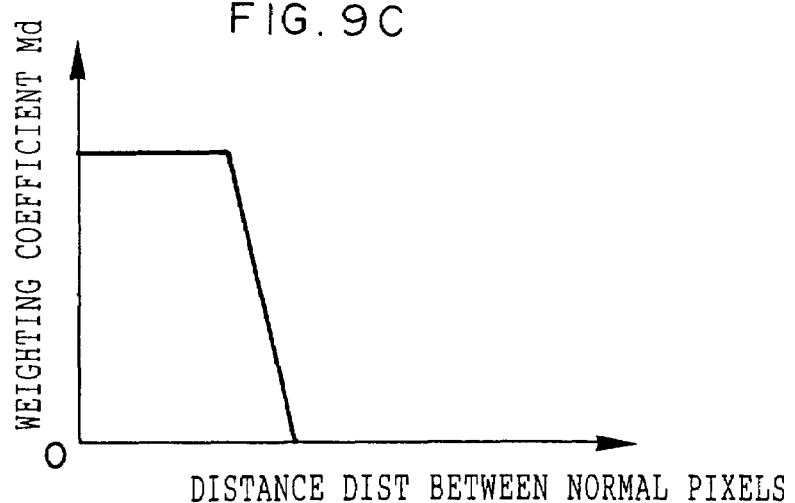
FIG. 9C is a liner drawing showing the relationship between the distance between normal pixels DIST and the weighting coefficient Mg.

Note that, in formula (2), Mg and Md are weighting coefficients. The weighting coefficient Mg can be determined in accordance with the gradient GRAD of the density gradient using a map such as that shown in FIG. 9B, for example, such that the weighting is larger when the gradient GRAD of the density gradient is smaller. The weighting coefficient Md can be determined in accordance with the distance DIST between normal pixels using a map such as that shown in FIG. 9C, for example, such that the weighting is larger when the distance DIST between normal pixels is less.

Accordingly, the value of the weighting coefficient M is greater in a scan direction in which the gradient GRAD of the density gradient and the distance DIST between normal pixels are small. In a scan direction in which one of the gradient GRAD of the density gradient and the distance DIST between normal pixels is large, the value of the weighting coefficient M is lessened (or is set at 0). In addition, in a scan direction in which the scan was ended by the affirmative determination in step 162, the value of the weighting coefficient M is unconditionally set to 0.

In the next step 180, a correction pixel value DIx for the defect pixel being processed is calculated for each of R, G, B in accordance with the following formula (3), based on the interpolation value VALIUEx (i) and the weighting coefficient M (i) for each scan direction.

$$DIx=\Sigma(M(i)\times\text{VALUE}x(i))/\Sigma(M(i)) \quad (3)$$

In formula (3), the interpolation value VALUEx (i) for each scan direction is weighted in accordance with the weighting coefficient M (i) so that the correction pixel value DIx is obtained. Therefore, even if the proper scan direction is different for each individual defect portion or for each portion inside a single defect portion, it is still possible to obtain the proper correction pixel value. Note that the above steps 178 and 180 correspond to the final correction value calculation device described in the eighth aspect of the present invention.

In the next step 182, a determination is made as to whether or not the above processing has been performed for all defect pixels inside the defect portion being processed. If this determination is negative, the routine returns to step 150 and the processings of step 150 and thereafter are repeated for those defect pixels for which the correction pixel value DIx has not yet been calculated. If the determination of step 182 is affirmative, the correction value deciding process using the interpolation method is ended.

Figure 10:
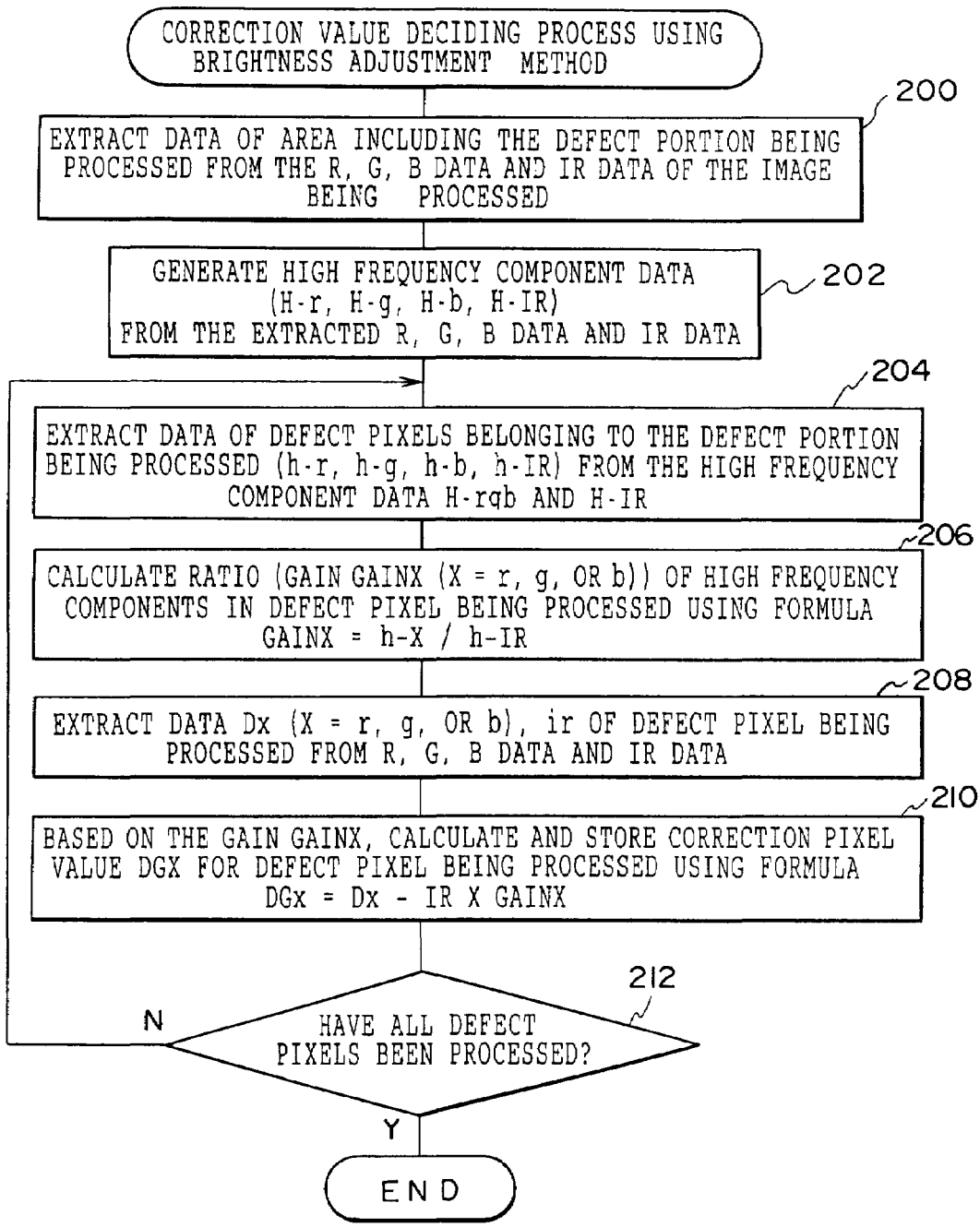
FIG. 10 is a flow chart showing the contents of processing to decide correction values using the brightness adjustment method.

When the correction value deciding process using the interpolation method has ended in the manner described above, the routine proceeds to step 114 shown in the flow chart in FIG. 3. In step 114, a determination is made as to whether or not to apply the brightness adjustment method to the correction of the defect portion being processed. If the application proportion $\alpha=1$, the determination is negative and the routine proceeds to step 118. If, however, the application proportion $\alpha\neq 1$, the determination is affirmative and the routine proceeds to step 116 where correction value deciding processing using the brightness adjustment method is performed. This correction value deciding processing using the brightness adjustment method will now be described with reference made to the flow chart shown in FIG. 10.

In step 200, the data of a part of a region that includes the defect portion being processed (for example, a region that is comprised of the defect portion being processed and the regions peripheral thereto) is extracted from the R, G, B image data and the IR data (data after transverse chromatic aberration correction) of the image being processed. In the next step 202, the extracted data is input into a high-pass filter, thereby generating R high frequency component data H–r, G high frequency component data H–g, B high frequency component data H–b, and IR high frequency component data H–IR, from the R, G, B, IR data.

In the next step 204, an unprocessed defect pixel is selected as the defect pixel to be processed from among each of the defect pixels belonging to the defect portion being processed. The high frequency component data h–r, h–g, h–b, and h–IR of the selected defect pixel is then extracted from the high frequency component data H–r, H–g, H–b, and H–IR. In the next step 206, the ratio of the high frequency components of R, G, B and the high frequency component of IR (the GainX wherein X represents one of R, G, or B) in the defect pixel being processed is calculated using the following formula (4).

$$\text{Gain}X=h-x/h-IR \quad (4)$$

Note that, in the above formula (4), because the ratio of the high frequency component data h–r, h–g, h–b to the high frequency component data h–IR is obtained as the gain GainX using high frequency component data from which direct current components and low frequency components have been removed, the gain GainX represents the ratio of the transmitted IR light to the transmitted light in each of the R, G, B wavelength regions that is caused by the difference in the refractive indexes of the IR light and the light of the R, G, B wavelength regions in the photographic film.

In step 208, the data Dr, Dg, Db, and ir of the defect pixel being processed is extracted from the R, G, B, IR data. Next, in step 210, a correction pixel value DGx for the defect pixel being processed is calculated using formula (5) below, based on the gain GainX calculated in step 206.

$$DGx = Dx - ir \times GainX \quad (5)$$

Because the second item of formula (5) corrects the data ir using the gain GainX representing the ratio of the transmitted IR light to the transmitted light in each of the R, G, B wavelength regions that is caused by the difference in the refractive indexes of the IR light and the light of the R, G, B wavelength regions in the photographic film, this value accurately represents the amount of change of the (logarithmic value of the) amount of transmitted R light or G light or B light at the position of the defect pixel being processed caused by scratches or the like present on the photographic film. Moreover, because formula (5) only alters the pixel value of the defect pixel by the amount (ir×GainX), it is possible to obtain an accurately corrected value of the change in the amount transmitted R light, G light, or B light caused by scratches or the like on the surface of the photographic film as the correction pixel value DGx. Note that the above steps 200 to 210 correspond to the calculation device described in the eleventh aspect of the present invention.

In the next step 212, a determination is made as to whether or not the above processing has been performed on all defect pixels belonging to the defect portion being processed. If this determination is negative, the routine returns to step 204 and the processes of step 204 and thereafter are repeated. If the determination in step 212 is affirmative, the correction value deciding processing using the brightness adjustment method is ended.

When the correction value deciding processing using the brightness adjustment method is ended in this manner, the routine proceeds to step 118 of the flow chart shown in FIG. 3, in which the correction value for the defect portion being processed is decided. The correction value for the defect portion in the present embodiment is comprised of a correction pixel value for each defect pixel belonging to the defect portion. When one of either the interpolation method or the brightness adjustment method is applied to the correction of the defect portion being processed, by setting each correction pixel value decided by either the interpolation method or the brightness adjustment method as the correction pixel value for each defect pixel belonging to the defect portion being processed, it is possible to decide the correction value for the defect portion being processed.

Furthermore, when both the interpolation method and the brightness adjustment method are applied to the correction of the defect portion being processed, a correction value for the defect portion being processed can be decided by calculating each correction pixel value D0x of each defect pixel belonging to the defect portion being processed using the following formula (6). In this case, DIx is the correction pixel value decided using the interpolation method; DGx is the correction pixel value decided using the brightness adjustment method; and α is the proportion of the application of the interpolation method.

$$D0x = \alpha \times DIx + (1-\alpha) \times DGx \quad (6)$$

From the above, it is possible to decide a correction value for the defect portion being processed so that the defect portion being processed is accurately corrected. Step 118 corresponds to the correction device described in the first, the eighth, and the eleventh aspects of the present invention.

In the next step 120, a determination is made as to whether or not the processes of step 104 and thereafter have been performed for all the defect portions detected in the defect portion detection process (step 102). If this determination is negative, the routine returns to step 104 and the processes of step 104 and thereafter are repeated with an unprocessed defect portion as the defect portion being processed. Accordingly, the selection of the correction method that should be applied or the deciding of the ranges of application (application proportion) thereof, and the deciding of the correction values can be performed for all the defect portions detected in the defect portion detection process, based on the calculation of predetermined feature amounts and the calculation results.

When the correction values are decided for all the detected defect portions, the determination in step 120 is affirmative and the routine proceeds to step 122. In step 122, the image processor 40 is informed of the correction values for each defect portion together with information representing the position of the defect portion (for example, the addresses of the defect pixels forming each defect portion), and the defect portion correction value deciding process is ended.

In the image processor 40, defect portion correction processing is performed to correct a defect portion in the fine scan image data (specifically, to rewrite each defect pixel belonging to the defect portion with a communicated correction pixel value) in accordance with correction values communicated to the image processor 40 from the control section 42 as a result of the defect portion correction value deciding process performed by the control section 42. Thus, the image processor 40 also corresponds to the correction device described in the first, eighth, and eleventh aspects of the present invention.

Moreover, the image processor 40 performs each type of image processing under the processing conditions decided by the setup calculation in the control section 42 on the image data that has undergone defect correction processing, and outputs the image data to the printer 16 via the I/O controller 38 and the I/F circuit 54. As a result, the defect portions that were chosen to be corrected are removed from the image recorded by exposure on the printing paper 68.

Note that, in the above description, the interpolation method and brightness adjustment method were described as examples of the plurality of types of correction method according to the present invention, however, the present invention is not limited to these. Namely, the so-called vignetting method in which a defect portion is vignetted by applying a low-pass filter or the like may be included, alternatively, no correction method (a decision may be made to not correct the defect portion) may be chosen depending on the value of the predetermined feature amount in the defect portion to be processed.

Moreover, in the above description, a predetermined feature amount such as a feature amount representing the correlation between R, G, B density changes in the defect portion was calculated and the application proportion a decided based on the results of this calculation, however, the present invention is not limited to this. Namely, it is also possible to compare the amount of transmitted light in each of the R, G, B, and IR wavelength regions in the defect portion with the amount of transmitted light in each of the R, G, B, and IR wavelength regions in the area surrounding the defect portion. Then, if the amount of transmitted light in all of the wavelength regions is reduced, the brightness adjustment is selected. If the amount of transmitted light in at least one of the R, G, B wavelength regions increases, then the interpolation method is selected. The above method of selecting the correction method corresponds to the sixth and seventh aspects of the present invention.

Furthermore, in the above description, in the correction value deciding process using the interpolation method (FIG. 7), the process of deciding the weighting in each direction by calculating the density gradient and distance between interpolation pixels for each of the directions was performed for every single defect pixel belonging to the defect portion, however, the present invention is not limited to this. Namely, it is also possible to calculate the final interpolation value for each defect pixel belonging to a single defect portion using the same value as the weighting in each direction (for example, the weighting for each direction obtained for the pixel positioned at a position corresponding to the center or centroid of the defect portion may be used for all the defect pixels belonging to a single defect portion).

Moreover, in the above description, in the correction value deciding process using the brightness adjustment method (FIG. 10), the gain GainX was used as the feature amount representing the difference in the refractive indexes of visible light and non-visible light in the image recording material, however, the present invention is not limited to this. Namely, because the differences in the refractive indexes of light of each wavelength in a photographic film is generally determined by the material of the film base of the photographic film, it is also possible, for example, to measure the difference in the refractive indexes in each of the R, G, B wavelength regions and in the IR wavelength region for each type of film (e.g. 135 size, 240 size, etc.) in advance, and then store the results of the measurements as data. The film type of the photographic film is then detected and the corresponding data read and used in the calculation and so on in formula (5).

Furthermore, in the above description, a structure was described in which an image was read using an area sensor (the area CCD 30), in which photoelectric conversion cells are arranged in a matrix pattern, as an example of an image reading device for reading an image recorded on a photographic film, however, the present invention is not limited to this. Namely, it is also possible to read an image using a line sensor in which photoelectric conversion cells are arranged in a line. Moreover, in the above description, a structure in which the image was read by photoelectrically converting light transmitted through a photographic film, however, the present invention is not limited to this. Namely, it is also possible to employ a structure in which an image is read by photoelectrically converting light reflected from a photographic film.

Further, in the above description, an example in which R, G, and B were read in the prescan and R, G, B, and IR were read in the fine scan was described, however, the present invention is not limited to this. Namely, the IR reading may be performed in the prescan only, or may be performed in both the prescan and the fine scan.

Moreover, the above description described the correction of defect portions caused by scratches or foreign matter present on a photographic film, however, the present invention is not limited to this. For example, when defect pixels are present in a photoelectric conversion element of a CCD or the like provided in a film scanner, digital camera, or the like, defect portions identical to defect portions caused by scratches or foreign matter are generated in an image represented by image data obtained by scanning an image, photographing a subject, or the like. It is possible to apply the present invention to the correction of defect portions caused by such pixel defects and to select the best correction method or to decide the application ranges of each correction method in accordance with the defect portion feature amount.

The detection of defect portions caused by pixel defects when, for example, the defect portions are caused by pixels found to be defective during the manufacturing of the device can be performed in the following manner. For example, during the production of an image processing device, information specifying defect pixels of a photoelectric conversion element discovered by inspection is stored in ROM or the like built into the device. The detection is then performed by reading the information stored in the ROM. Alternatively, if, for example, the film scanner is structured such that the photoelectric conversion (i.e. the reading) of the visible light and the IR light is performed by the same photoelectric conversion element (i.e. is structured, for example, such that the light of each wavelength region is read in sequence by rotating the turret), then the detection of defect portions in an image caused by pixel defects in the photoelectric conversion element can be performed by comparing the results of the visible light reading with the results of the IR light reading.

As has been described above, according to the first and thirteenth aspects of the present invention, based on a feature amount in a defect portion of an image represented by image information, either a correction method that should be applied to correct the defect portion is selected from a plurality of correction methods, or ranges of application of each of two or more correction methods to be applied to the correction of the defect portion are decided; and either correction of the defect portion is performed by applying the selected correction method to the image information, or correction of the defect portion is performed by applying each of the two or more correction methods in the application ranges decided to the image information. Therefore, the excellent effect is achieved that it is possible to correct each type of various defect portions with a high degree of accuracy.

In the second aspect of the present invention, according to the first aspect of the present invention, non-visible light is irradiated onto an image recording material on which an image is recorded and the detection of defect portions in an image is performed using the results of a photoelectric conversion of the non-visible light that either passes through the image recording material or is reflected by the image recording material. Therefore, in addition to the above effect, the effect is achieved that defect portions caused by foreign matter or scratches present within the image recording area of the image recording material are reliably detected.

In the third aspect of the present invention, according to the first aspect of the present invention, the selection of the correction method or the deciding of the application ranges is performed using at least one of: a correlation of density changes in each component color in areas adjacent to the defect portion; density distribution in areas surrounding the defect portion; whether or not the defect portion is present within a principal area; and to what extent the defect portion overlaps with the principal area. Therefore, in addition to the above effects, the effect is achieved that the selection of the correction method or the deciding of the application ranges can be accurately performed.

In the fourth aspect of the present invention, according to the second aspect of the present invention, the selection of the correction method or the deciding of the application ranges is performed using at least one of: a correlation between changes in the amount of transmitted or reflected non-visible light and visible light in an area adjacent to the defect portion; and the amount of transmitted or reflected non-visible light in an area adjacent to the defect portion. Therefore, in addition to the above effects, the effect is achieved that the selection of the correction method or the deciding of the application ranges can be accurately performed.

In the sixth aspect of the present invention, according to the second aspect of the present invention, when light of a predetermined plurality of wavelength regions from among non-visible and visible light regions is irradiated onto the image recording material, then if the amount of non-visible transmitted light in the defect portion is less than the amount of non-visible transmitted light in an area surrounding the defect portion, and if the amount of transmitted light of at least one wavelength region from among the plurality of wavelength regions in the defect portion is greater than the amount of transmitted light in the area surrounding the defect portion, the interpolation method is selected as the correction method to be used for correcting the defect portion. As a result, in addition to the above effects, the effect is achieved that it is possible to accurately correct defect portions caused by scratches that have damaged the dye layer.

In the seventh aspect of the present invention, according to the second aspect of the present invention, when light of a predetermined plurality of wavelength regions from among non-visible and visible light regions is irradiated onto the image recording material, then if the amount of any of non-visible transmitted light and transmitted light of the plurality of wavelength regions in the defect portion is less than the amount of any of non-visible transmitted light and transmitted light of the plurality of wavelength regions in an area surrounding the defect portion, the brightness adjustment method is selected as the correction method to be used for correcting the defect portion. As a result, in addition to the above effects, the effect is achieved that it is possible to accurately correct defect portions caused by scratches that have not damaged the dye layer.

In the eighth and fourteenth aspects of the present invention, image feature amounts are calculated along a plurality of different directions running from inside a defect portion in an image. In addition, correction values are obtained by interpolation from information of areas in a predetermined direction on the image relative to the defect portion for each of the plurality of directions. Final correction values are determined from the correction values for each direction based on the image feature amounts in each direction, and correction of the defect portions is then performed. Therefore, the effect is achieved that it is possible to suppress unevenness in the accuracy of the correction when correcting defect portions using the interpolation method.

In the ninth aspect of the present invention, according to the eighth aspect of the present invention, because, as an image feature amount, at least one of the following is calculated for each of a plurality of directions, namely: the density change in the image along a predetermined direction; the change in the amount of non-visible light transmitted through the image recording material or reflected by the image recording material along a predetermined direction; the number of defect pixels present on the image within a fixed distance along a predetermined direction; and the distance traced along the image to a point in a predetermined direction at which normal pixels that do not belong to a defect portion appear, in addition to the above effects, the effect is achieved that it is possible to obtain image feature amounts which allow an accurate evaluation to be made as to whether or not each of a plurality of directions is a proper interpolation direction.

In the tenth aspect of the present invention, according to the eighth aspect of the present invention, a calculation is performed for each of the plurality of directions to determine the image feature amount or the correction value in a range as far as to a point, when tracing along the image in a predetermined direction, at which a fixed number of normal pixels that do not belong to a defect portion appear. Therefore, in addition to the above effects, the additional effect is achieved that the time required to calculate the image feature amounts or the correction values can be shortened.

In the image processing method according to the eleventh and fifteenth aspect of the present invention, a brightness alteration amount is calculated based on the amount of transmitted or reflected non-visible light in an area adjacent to the defect portion when non-visible light is irradiated onto a defect portion of an image on the image recording material, and on the difference in the refractive indexes of visible light and non-visible light in the image recording material. Moreover, the image information is corrected so that the brightness of the defect portion changes by the above brightness change amount. Therefore, the excellent effect is achieved that it is possible to improve the correction accuracy of the defect portion using the brightness adjustment method.

In the twelfth aspect of the present invention, according to the eleventh aspect of the present invention, a feature amount representing a difference between the refractive indexes of visible light and non-visible light is acquired either on the basis of the type of image recording material, or by calculating a ratio of a value obtained when high frequency components are extracted from a change in the amount of transmitted or reflected non-visible light in an area adjacent to the defect portion and a value obtained when high frequency components are extracted from a change in an amount of transmitted or reflected visible light in an area adjacent to the defect portion when visible light is irradiated onto the image recording material. Therefore, in addition to the above effects, the effect is obtained that it is possible to determine brightness alteration amounts for accurately correcting changes in the amount of transmitted or reflected visible light caused by scratches and the like on the image recording material.

In the sixteenth aspect of the present invention, a program for executing on a computer a process including the following steps is recorded on a recording medium, namely: a first step in which a defect portion of an image is detected; a second step in which, based on an amount of features of the defect portion, either the correction method to be applied is selected, or ranges of application of each of two or more correction methods to be applied are decided; and a third step in which either correction of the defect portion is performed by applying the selected correction method, or correction of the defect portion is performed by applying the two or more correction methods in the application ranges decided for each. Therefore, the excellent effect is achieved that it is possible to accurately correct each of various defect portions.

In the seventeenth aspect of the present invention a program for executing on a computer a process including the following steps is recorded on a recording medium, namely: a first step in which image feature amounts are calculated along a plurality of different directions running from inside a defect portion in an image, and correction values are obtained by interpolation from information of an area in a predetermined direction on the image relative to the defect portion for each of the plurality of directions; a second step in which final correction values are determined from the correction values for each of the directions based on the image feature amounts in each of the directions; and a third step in which correction of the defect portions is performed on the image information using the final correction values. Therefore, the excellent effect is achieved that unevenness in the correction accuracy when correcting defect portions using the interpolation method can be suppressed.

In the eighteenth aspect of the present invention, a program for executing on a computer a process including the following steps is recorded on a recording medium, namely: a first step in which a brightness alteration amount for correcting a defect portion of an image is calculated based on the amount of transmitted or reflected non-visible light in an area adjacent to the defect portion when non-visible light is irradiated onto the image recording material, and on the difference in the refractive indexes of visible light and non-visible light in the image recording material; and a second step in which the image information is corrected so that the brightness of the defect portion changes by the above brightness change amount. Therefore, the excellent effect is achieved that the accuracy of the correction of a defect portion using the brightness adjustment method can be improved.

What is claimed is:

1. An image processing device comprising:
    (a) a detecting device for detecting defect portions in an image represented by electronic information;
    (b) a deciding device for selecting a correction method from among a plurality of types of correction methods for correcting a defect portion, or for deciding a range of application of each of at least two correction methods correcting a defect portion; and
    (c) a correction device for correcting defect portions in the electronic information by applying the correction method selected by the deciding device, or for correcting defect portions in the electronic information by applying the at least two methods in the application ranges decided by the deciding device,
    wherein the deciding device selects the correction method or decides the application ranges using at least one characteristic of the defect portion selected from the group consisting of: a correlation of density changes in each component color in an area adjacent to the defect portion; density distribution in areas surrounding the defect portion of the image; an information as to whether the defect portion is present within a principal area of the image or not; and extent of overlap of the defect portion with a principal area of the image.

2. An image processing device comprising:
    (a) a feature amount calculation device for use with electronic information representing an image having a defect portion, the feature amount calculation device being for calculating respective amounts of image features in a plurality of different directions from within defect portions;
    (b) an individual correction value calculation device for obtaining interpolation correction values for correcting the defect portion from information through areas of the image in each of the plurality of directions;
    (c) a final correction value calculation device for obtaining, based on amounts of image features of each direction calculated by the feature amount calculation device, a final correction value from correction values calculated for each direction by the individual correction value calculation device; and
    (d) a correction device for correcting the defect portion in the electronic information representing the image, using a final correction value calculated by the final correction value calculation device.

3. The image processing device according to claim 2, wherein, as the image feature amount, the feature amount calculation device calculates for each of a plurality of directions at least one of: a density change in the image along a predetermined direction; a change in an amount of non-visible light along a predetermined direction transmitted through the image recording material or reflected by the image recording material when non-visible light is irradiated onto an image recording material on which an image represented by the image information is recorded; a number of defect pixels present on the image within a fixed distance along the predetermined direction; and a distance traced along the image to a point in a predetermined direction at which normal pixels begin to appear, which do not correspond to a defect portion.

4. The image processing device according to claim 2, wherein at least one of the feature amount calculation device and the individual correction value calculation device performs for each of the plurality of directions a calculation to determine the image feature amount or the correction value in a range as far as to a point, when tracing along the image in a predetermined direction, at which a fixed number of normal pixels begin to appear, which do not correspond to a defect portion.

5. An image processing device for use in producing electronic information representing an image recorded on image recording material, the image processing device comprising:
    (a) a calculation device for calculating a brightness alteration amount for correcting a defect portion in the image based on an amount of transmitted or reflected non-visible light in an area adjacent to the defect portion when light is irradiated onto the image recording material, and a difference in the refractive indexes of visible light and non-visible light in the image recording material; and
    (b) a correction device for correcting electronic information representing the image such that the brightness of the defect portion of the image represented by the electronic information changes by an amount calculated by the calculation device.

6. The image processing device according to claim 5, wherein the calculation device acquires the feature amount based on one of the type of image recording material and by calculating a ratio of a value obtained when high frequency components are extracted from a change in the amount of transmitted or reflected non-visible light in an area adjacent to the defect portion when non-visible light is irradiated onto the image recording material and a value obtained when high frequency components are extracted from a change in an amount of transmitted or reflected visible light in an area adjacent to the defect portion when visible light is irradiated onto the image recording material.

7. An image processing method for correcting electronic information representing an image having a defect portion, wherein the image is recorded on image recording material, the method comprising the steps of:
    (a) irradiating the image recorded on image recording material with non-visible light;
    (b) receiving the light after irradiation of the image;
    (c) calculating a brightness alteration amount for correcting a defect portion in the electronic information representing the image, based on the amount of non-visible light received from the image in the step of receiving, in an area adjacent to the defect portion, and on the difference in refractive indexes of visible light and non-visible light in the image recording material; and
    (d) correcting electronic information representing the image so that the brightness of the defect portion in the electronic information changes by an amount calculated in the step of calculating a brightness alteration.

8. A recording medium comprising program steps recorded thereon, which when used to program a computer, cause the computer to execute the following steps:
  (a) calculating a brightness alteration amount for correcting a defect portion in electronic information representing an image recorded on a recording medium, based on an amount of transmitted or reflected non-visible light in an area adjacent to the defect portion when non-visible light is irradiated onto the image recording material, and on the difference in refractive indexes of visible light and non-visible light in the image recording material; and
  (b) correcting the brightness in the electronic information so that the brightness of the defect portion changes by the amount calculated in the step of calculating a brightness alteration amount.

9. An image processing device comprising:
  (a) a detecting device for detecting defect portions in an image represented by electronic information;
  (b) a deciding device for selecting a correction method from among a plurality of types of correction methods for correcting a defect portion, or for deciding a range of application of each of at least two correction methods correcting a defect portion; and
  (c) a correction device for correcting defect portions in the electronic information by applying the correction method selected by the deciding device, or for correcting defect portions in the electronic information by applying the at least two methods in the application ranges decided by the deciding device,
  wherein the plurality of types of correction methods comprises a vignetting method in which image information is corrected by reducing high frequency components of a spatial frequency of a defect portion and an area adjacent to the defect portion.

10. The image processing device according to claim 2, wherein the final correction value calculation device obtains a final correction value by calculating weighting coefficients for each direction based on a density gradient and a distance between normal pixels calculated and stored for each direction.

11. The image processing device according to claim 2, wherein the plurality of different directions from within defect portions radiates outwards from the defect portions.

12. The image processing device according to claim 2, wherein the plurality of different directions from within defect portions comprises a plurality of scanning directions and wherein one of the plurality of scanning directions is a straight line in a direction going away from the defect portions and a plurality of the scanning directions are performed in directions 180 degrees opposite each other.

* * * * *